United States Patent
Willberg et al.

(10) Patent No.: US 11,111,784 B2
(45) Date of Patent: Sep. 7, 2021

(54) SYSTEM AND METHOD FOR DETERMINING BOTTOMHOLE CONDITIONS DURING FLOWBACK OPERATIONS OF A SHALE RESERVOIR

(71) Applicant: SCHLUMBERGER TECHNOLOGY CORPORATION, Sugar Land, TX (US)

(72) Inventors: Dean Michael Willberg, Salt Lake City, UT (US); Ryan Donald Williams, Denver, CO (US); Katharine Moncada, Houston, TX (US); Jean Desroches, Paris (FR); Philippe Enkababian, Richmond, TX (US); Pavel Spesivtsev, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 525 days.

(21) Appl. No.: 15/545,771

(22) PCT Filed: Jan. 22, 2016

(86) PCT No.: PCT/US2016/014431
§ 371 (c)(1),
(2) Date: Jul. 24, 2017

(87) PCT Pub. No.: WO2016/118807
PCT Pub. Date: Jul. 28, 2016

(65) Prior Publication Data
US 2018/0016897 A1    Jan. 18, 2018

Related U.S. Application Data

(60) Provisional application No. 62/107,157, filed on Jan. 23, 2015.

(51) Int. Cl.
E21B 47/06    (2012.01)
E21B 49/00    (2006.01)
(Continued)

(52) U.S. Cl.
CPC ........ *E21B 49/008* (2013.01); *E21B 41/0092* (2013.01); *E21B 43/12* (2013.01);
(Continued)

(58) Field of Classification Search
CPC ....... G01V 9/02; E21B 41/0092; E21B 43/12; E21B 43/26; E21B 47/06; E21B 49/008; E21B 49/087
(Continued)

(56) References Cited

U.S. PATENT DOCUMENTS 3,224,506 A     12/1965  Huitt et al.
4,630,868 A  *  12/1986  Jones .................... E21B 43/283
                                                         166/250.09
(Continued)

FOREIGN PATENT DOCUMENTS

WO    2014182739 A2    11/2014

OTHER PUBLICATIONS

Abbasi, Majid Ali, et al., "Flowback Analysis for Fracture Characterization," Society of Petroleum Engineers, SPE Canadian Unconventional Resources Conference, Calgary, Alberta, Canada, Oct. 30-Nov. 1, 2012, pp. 1-23 (Year: 2012).*
(Continued)

*Primary Examiner* — Jeffrey P Aiello
(74) *Attorney, Agent, or Firm* — Rodney Warfford

(57) ABSTRACT

A system and method is provided that determines at least one bottomhole condition during flowback operations in a well that traverses a hydraulically fractured reservoir. The system and method measure fluid properties of fluids produced at a surface-location of the well during the flowback operations.
(Continued)

A transient fluid flow simulator determines composition and properties of fluids in the well between the surface-location of the well and at least one bottomhole-location of the well based on the measured fluid properties. At least one bottomhole condition in the well is determined based on the composition and properties of fluids in the well between the surface-location and at least one bottomhole-location of the well.

21 Claims, 15 Drawing Sheets

(51) Int. Cl.

| | | |
|---|---|---|
| *E21B 43/267* | (2006.01) | |
| *E21B 43/26* | (2006.01) | |
| *E21B 41/00* | (2006.01) | |
| *E21B 43/12* | (2006.01) | |
| *E21B 49/08* | (2006.01) | |
| *E21B 47/107* | (2012.01) | |
| *G01V 9/02* | (2006.01) | |

(52) U.S. Cl.
CPC .......... *E21B 43/26* (2013.01); *E21B 43/267* (2013.01); *E21B 47/06* (2013.01); *E21B 49/005* (2013.01); *E21B 49/087* (2013.01); *E21B 47/107* (2020.05); *G01V 9/02* (2013.01)

(58) Field of Classification Search
USPC ......... 73/152.02, 152.06; 166/250.01, 250.1, 166/264, 308.1; 702/6, 11–13, 181; 703/7, 10
See application file for complete search history.

(56) References Cited

U.S. PATENT DOCUMENTS

| | | | |
|---|---|---|---|
| 5,353,637 | A | 10/1994 | Plumb et al. |
| 8,812,238 | B2 | 8/2014 | Ljungdahl et al. |
| 9,863,240 | B2 * | 1/2018 | Geehan ................. G06F 30/20 |
| 2006/0070735 | A1 | 4/2006 | Guerra et al. |
| 2008/0000637 | A1 | 1/2008 | McDaniel et al. |
| 2008/0133193 | A1 * | 6/2008 | Gdanski ............... E21B 47/1015 703/10 |
| 2008/0162099 | A1 * | 7/2008 | Vega Velasquez ...... E21B 43/26 703/10 |
| 2008/0210470 | A1 | 9/2008 | Stewart |
| 2010/0181073 | A1 * | 7/2010 | Dupriest .................. E21B 21/00 166/308.1 |
| 2010/0204972 | A1 * | 8/2010 | Hsu ........................ G01V 11/00 703/10 |
| 2010/0206560 | A1 | 8/2010 | Atencio |
| 2010/0217574 | A1 * | 8/2010 | Usadi ..................... E21B 43/00 703/10 |
| 2010/0218941 | A1 * | 9/2010 | Ramurthy ............... E21B 43/26 166/250.1 |
| 2010/0307755 | A1 | 12/2010 | Xu et al. |
| 2011/0011595 | A1 | 1/2011 | Huang et al. |
| 2011/0040536 | A1 * | 2/2011 | Levitan .................. G06F 30/20 703/2 |
| 2011/0042076 | A1 * | 2/2011 | Reitsma ................. E21B 21/08 166/250.01 |
| 2012/0228027 | A1 * | 9/2012 | Sehsah .................. E21B 21/08 175/48 |
| 2012/0303281 | A1 | 11/2012 | Hon et al. |
| 2013/0068452 | A1 | 3/2013 | Wingate |
| 2014/0083687 | A1 | 3/2014 | Poe et al. |
| 2014/0121970 | A1 | 5/2014 | Ljungdahl et al. |
| 2014/0299210 | A1 | 10/2014 | Atherton |
| 2014/0299552 | A1 | 10/2014 | Stewart et al. |
| 2014/0352968 | A1 | 12/2014 | Pitcher et al. |
| 2014/0365130 | A1 * | 12/2014 | Woods ................ E21B 47/1005 702/12 |
| 2016/0125104 | A1 * | 5/2016 | Waltrich ............ G06F 9/44505 703/2 |
| 2016/0230526 | A1 * | 8/2016 | Crews .................. E21B 43/305 |

OTHER PUBLICATIONS

Davis et al., "Novel Controlled Pressure Coring and Laboratory Methodologies Enable Quantitative Determination of Resource-in-Place and PVT Behavior of the Duvernay Shale", SPE 167199, SPE Unconventional Resources Conference-Canada, Nov. 5-7, 2013, 22 pages.
Bendiksen et al., "The dynamic two-fluid model OLGA: theory and application", SPE 19451, SPE Prod. Eng., 1991, pp. 171-180.
Warren et al., "The Behavior of Naturally Fractured Reservoirs", SPE Journal, vol. 3, No. 3, Sep. 1963, pp. 245-255.
Xu et al., "Quick Estimate of Initial Production from Stimulated Reservoirs with Complex Hydraulic Fracture Network", SPE 146753, SPE Annual Tech. Conf. and Exhibition, Denver, CO, Oct. 30-Nov. 2, 2011, 13 pages.
Extended European Search Report issued in European Patent Appl. No. 16740803.8 dated Oct. 31, 2018; 13 pages.
Abbasi et al., "Flowback Analysis for Fracture Characterization", SPE 162661, SPE Canadian Unconventional Resources Conference, Nov. 1, 2012, 23 pages.
Salim et al., "A Transient Multi-Phase Flow Simulation using Steady-State Correlations for Coiled Tubing Applications—New Insights to Old Problems", SPE 130647, 2010 SPE/ICoTA Coiled Tubing & Well Intervention Conference & Exhibition, Mar. 24, 2010, 15 pages.
Gdanski et al., "Using Lines-of-Solutions to Understand Fracture Conductivity and Fracture Cleanup", SPE 142096, SPE Production and Operations Symposium, Mar. 27, 2011, pp. 16 pages.
Jingjing et al., "Pressure Transient Analysis and Flux Distribution for Multistage Fracutred Horizontal Wells in Triple-Porosity Reservoir Media with Consideration of Stress-Sensitivity Effect", Journal of Chemistry, vol. 2015, Mar. 18, 2015, 16 pages.
Thomas, O., "Reservoir Analysis Based on Compositional Gradients", a Dissertation submitted to the Department of Energy Resources Engineering and the Committee on Graduate Studies of Stanford University, 2007, 177 pages.
Oldenburg, C. M. et al., "Numerical Simulation of the Macondo well blowout reveal strong control of oil flow by reservoir permeability and exsolution of gas", 2012 PNAS Dec. 11, 2012, 109(50), 6 pages.
Landet, "Modeling and Control for Managed Pressure Drilling from Floaters Heave Compensation by Automatic Nonlinear Control", NTNU Jun. 2011, 126 pages.
Zhou, "Adaptive Observer Design for the Bottomhole Pressure of a Managed Pressure Drilling System", Proceedings of the 47th IEEE Conference on Decision and Control Cancun, Mexico, Dec. 9-11, 2008, pp. 2961-2966.

\* cited by examiner

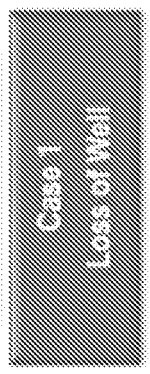
FIG. 1A
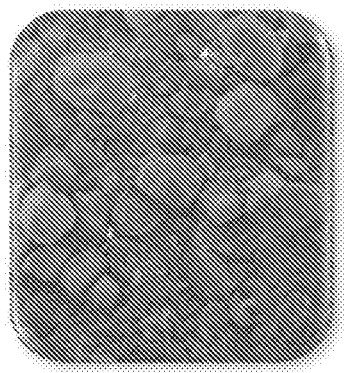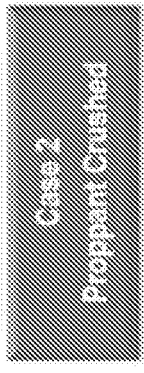
FIG. 1B
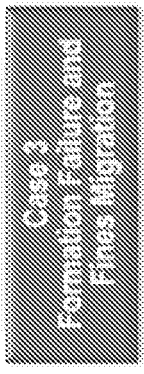
FIG. 1C
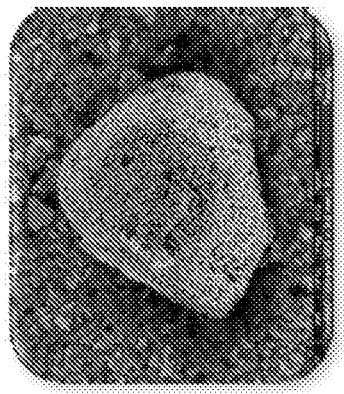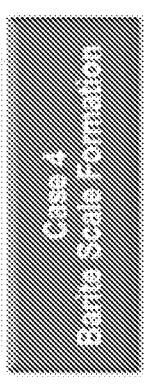
FIG. 1D

| | Input Parameter |
|---|---|
| Fracture | Scheduled position of fractures/perforation guns (MD [m], TVD [m]) |
| | Fracture length (radius) [m] |
| | Fracture width (apperture) [m] |
| | Fracture (proppant pack) permeability [mD] |
| | Fracture (proppant pack) porosity [-] |
| Reservoir | Reservoir permeability [mD] |
| | Reservoir prosity [-] |
| | Initial reservoir presure [bar] |
| | Type of reservoir [oil/gas] |
| Wellbore | Wellbore Geometry (MD [m], TVD [m], diameters [m]) |
| | Pressure control schedule (WHP or WHDCP or BHP vs time [bar]) |
| | Surface chokes schedule |
| Fluids | Viscosity of fracturing fluid [cp] |
| | Viscosity of reservoir fluid [cp] |
| | Density of fracturing fluid [kg/m3] |
| | Density of reservoir fluid [kg/m3] |
| | Initial conditions (distribution of fluids in the system before flowback) |

FIG. 7

SYSTEM AND METHOD FOR DETERMINING BOTTOMHOLE CONDITIONS DURING FLOWBACK OPERATIONS OF A SHALE RESERVOIR

CROSS-REFERENCE TO RELATED APPLICATIONS

This application claims priority under 35 U.S.C. § 119(e) to U.S. Provisional Application No. 62/107,157, filed on Jan. 23, 2015, the entire contents of which are incorporated herein by reference.

BACKGROUND

1. Field

The present disclosure relates to the production of hydrocarbons from subterranean reservoirs, and particularly from tight reservoirs such as reservoirs having a matrix permeability of less than 1 micro-Darcy.

2. State of the Art

During a hydraulic fracturing ("fracking") treatment, hydraulic fracturing fluid is introduced into a well under high pressure to create cracks or fractures in the reservoir rock through which trapped hydrocarbons (e.g., natural gas and/or petroleum) and connate water can flow from the rock more freely. For shale reservoirs, the hydraulic fracturing fluid typically consists primarily of water. A wide variety of chemical additives can also be used in the hydraulic fracturing fluid. Such additives can include dilute acids, biocides, breakers, corrosion inhibitors, crosslinkers, friction reducers, gels, potassium chloride, oxygen scavengers, pH adjusting agents, scale inhibitors and surfactants. Proppant such as sand, aluminum shot, or ceramic beads can also be used in the hydraulic fractures fluid. The proppant is intended to hold fractures open after the hydraulic fracturing treatment is completed.

Following the hydraulic fracturing treatment, and before placing the well into production, a process commonly referred to as "flowback" is commenced. During flowback the elevated pressure in the reservoir caused by introducing the pressurized hydraulic fluid is reduced or "drawn down" allowing fluids (including the hydraulic fracturing fluids and components thereof (such as proppant), cleaning the path for hydrocarbons (e.g., natural gas and/or petroleum) and connate water) to flow from the well back to the surface.

Procedure and time for the flowback operation are dictated by economic considerations and reservoir properties. Sometimes, it is desirable to conduct the flowback operations immediately after the fracturing treatment so that the well can benefit from non-dissipated reservoir pressure. There are also reservoirs where wells show better production performance after "seasoning", when fractured fluid is let to dissipate in formation for several weeks before initiating flowback procedure. In all cases after the flowback is initiated it is desirable to flowback the well at maximum technically and operationally allowable rate so that the well can be put into production quickly. At the same time the flowback rate should not exceed certain limits defined by formation and type of injected materials as exceeding these limits may result in excessive flowback of propping material, formation destabilization and, as a result, in poorer well production performance. Current practices for flowback operations are, in general, based on rule-of-thumb and are embodied in confidential flowback operational procedures of various well operators. Such rule-of-thumb flowback practices can cause extensive tensile rock failure, excessive proppant flowback, fines migration, and scale formation.

FIG. 1A shows extensive tensile rock failure, which can lead to loss of the production for the treated zone or even sometimes loss of the well. FIG. 1B shows an excessive amount of proppant that have flowed from the fractures back into the well and to the surface, which can allow the newly formed fractures to reduce in width or close, thereby restricting the flow of hydrocarbons from the reservoir rock. FIG. 1C shows fines that have flowed from the fractures back into the well, which indicate that fines have been generated in the fracture; such fines can lead to complete plugging of the fracture and loss of the treated zone. FIG. 1D shows scale that can be produced during flowback. The scale can coat perforations, casing, production tubulars, valves, pumps, and downhole completion equipment, and thus limit production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a system and method that determines at least one bottomhole condition during flowback operations in a well that traverses a hydraulically fractured reservoir. The system and method measure fluid properties of fluids produced at a surface-location of the well during the flowback operations. A transient fluid flow simulator determines composition and properties of fluids in the well between the surface-location of the well and at least one bottomhole-location of the well based on the measured fluid properties. At least one bottomhole condition in the well is determined based on the composition and properties of fluids in the well between the surface-location and at least one bottomhole-location of the well.

The at least one bottomhole condition can include pressure in the well at one or more bottomhole locations of the well. The at least one bottomhole condition can also include one or more fracture properties in the hydraulically fractured reservoir, such as unpropped fracture area and/or fracture conductivity of a fracture in a near-wellbore region adjacent the well.

The calculations of the transient fluid flow simulator in determining the pressures and fluid compositions in the well including bottomhole pressure and other bottomhole conditions can involve a wide variety of data, including a set point or other predefined parameter, data from at least one other well, data characterizing mineralogy of the hydraulically fractured reservoir, data derived during drilling the well, etc.

The measurements of the system and calculations of the transient fluid flow simulator can be taken and processed in real-time enabling real-time control over the flowback process. As used herein, "real-time" relates to measurement and computation times occurring over a duration of less than fifteen minutes, and in one embodiment less than ten minutes, and in another embodiment less than one second. In the context of a control system, real-time control denotes a system that generates, receives, and processes data in real-time to carry out the respective control operation.

The transient fluid flow simulator may incorporate various sub-models that are coupled together. Specifically, the transient fluid flow simulator may incorporate a well model and a fracture flow model, which models the flow in the well piping as well as through the reservoir and/or the hydraulic fracture. The well model may incorporate output of a particle transport model and a flow model. The particle transport model models the movement of solid particles along the well and the flow model models the movement of fluids along the well. The transient fluid flow simulator may incorporate output of a fluid-fluid displacement model within the fractures, a geomechanical model of geomechanical behavior of the formation rock, and a reservoir model that models the inflow of fluid into the fractures. The geomechanical model models the interaction between the stresses, pressures, and temperatures in the reservoir rock and the hydraulic fracture. The fluid-fluid displacement model models the displacement of oil, gas, and water by hydraulic fracturing fluid in the reservoir rock and also the displacement of the hydraulic fracturing fluid by the resident reservoir fluids. The reservoir model models the physical space of the reservoir by an array of discrete cells, delineated by a grid, which may be regular or irregular. The array of cells is usually three-dimensional, although one-dimensional and two-dimensional models can be used. Values for attributes such as porosity, permeability and water saturation are associated with each cell. The value of each attribute is implicitly deemed to apply uniformly throughout the volume of the reservoir represented by the cell.

The transient fluid flow simulator may have a plurality of input parameters related to the fracture reservoir, the well, and fluids expected to flow through fractures and through the well. Also, the transient fluid flow simulator may have a plurality of outputs including: a one-dimensional (e.g., radial direction from the wellbore) pressure distribution along fractures; a one-dimensional fluid saturation distribution for oil/gas/water along the fractures; one-dimensional pressure distribution along the length of the well; and one dimensional fluid saturation distributions for oil/gas/water along the length of the well up to the surface. The outputs can vary with time. The one-dimensional radial distributions of pressure and saturation along the fractures can be modeled at various positions along the well. The transient fluid flow simulator model may output the aforementioned pressure and fluid distributions as a function of wellhead pressure.

BRIEF DESCRIPTION OF THE DRAWINGS

FIG. 1A to 1D are illustrations of some types of solids that may flow from a well to the surface during a flowback operation.

FIG. 7 is a table showing input parameters for an illustrative flowback model.

DETAILED DESCRIPTION

Illustrative embodiments of the present disclosure are described below. In the interest of clarity, not all features of an actual implementation are described in this specification. It will be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further, like reference numbers and designations in the various drawings indicate like elements.

Figure 2:
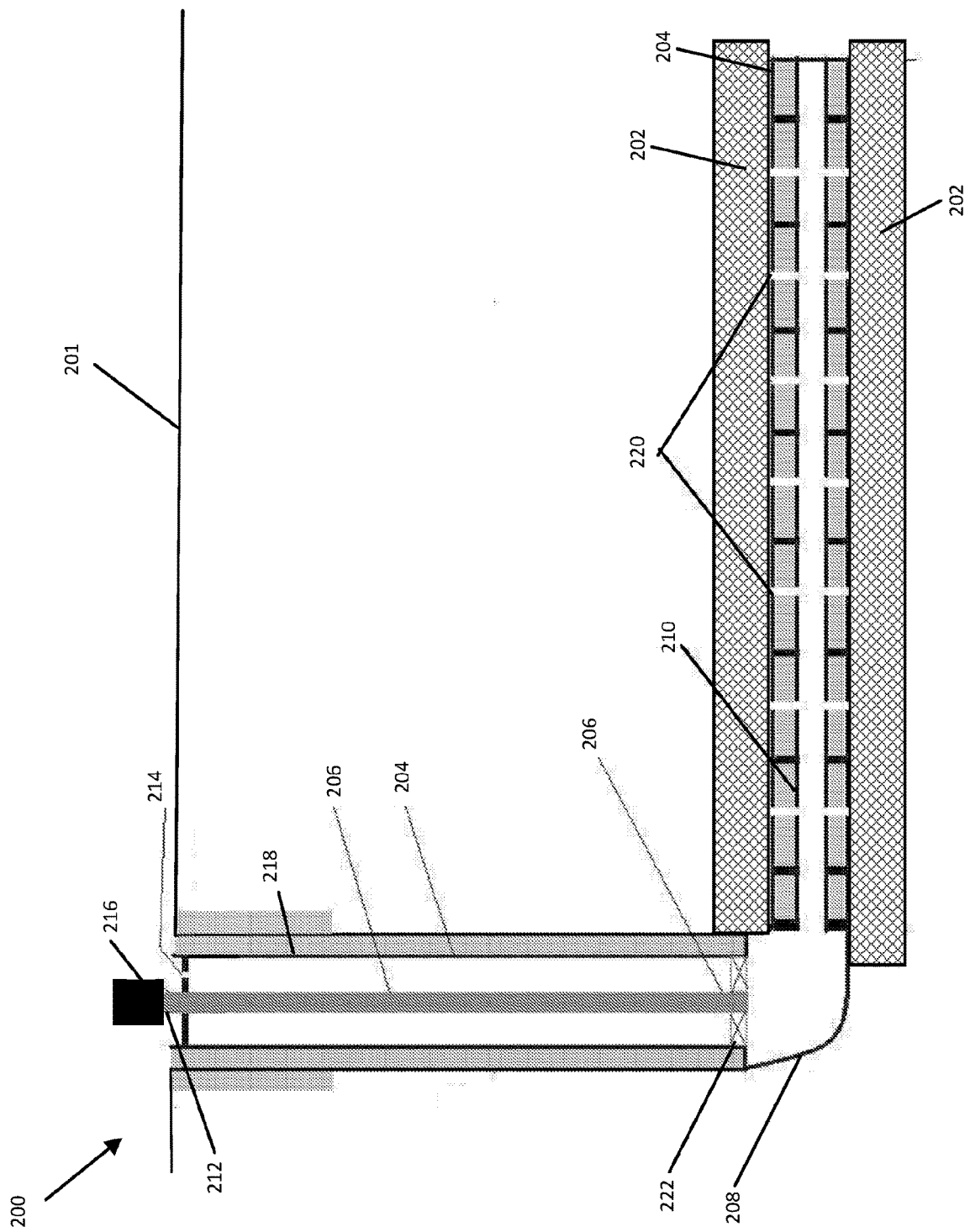
FIG. 2 is a schematic illustration of a well that traverses a hydraulically fractured reservoir.

FIG. 2 shows a schematic of a well 200 of a hydraulically fractured hydrocarbon reservoir 202. While certain elements of the well 200 are illustrated in FIG. 2, other elements of the well 200 (e.g., blow-out preventers, wellhead "surface tree") have been omitted for clarity of illustration. The well 200 includes an interconnection of pipes, including vertical and horizontal casing 204, production tubing 206, transitions 208, and a production liner 210 that connect to a processing facility (not shown) at the surface 201. The production tubing 206 extends inside the casing 204 and terminates at a tubing head 212 at or near the surface 201. The casing 204 contacts the wellbore 218 and terminates at casing head 214 at or near the surface 201. The production liner 210 and horizontal casing 204 have aligned radial openings termed "perforation zones" 220 that allow fluid communication between the production liner 210 and the hydraulically fractured reservoir 202. An annular packer 222 is set at a lower end of the production tubing 206 and provides a seal between the production tubing 206 and the casing 204 so that fluid in the production liner 210 is directed into the production tubing 206 rather than between the production tubing 206 and the casing 204.

The flow rate of the fluid flowing in the well 200 to the surface 201 is a function of the drawdown pressure of the well 200. As used herein, "drawdown pressure" means the difference between the average reservoir pressure and the bottomhole pressure. As used herein, "average reservoir pressure" means the average pressure of the fluids trapped within the reservoir rock 202, and "bottomhole pressure" means the pressure at a specified location at the bottom of the well, such as at the top (downstream end) of the production liner 210 in FIG. 2. Thus, in at least one embodiment, the drawdown pressure is calculated to be the difference between the average pressure in the reservoir rock 202 and the flowing pressure in the production liner 210 at the downstream end of the production liner at a specified time. As will be discussed in greater detail below, the determination of the average pressure in the reservoir rock 202 and the flowing pressure in the production liner 210 at the downstream end of the production liner will be determined by solving for pressure and flow distributions throughout the well and the hydraulically fractured reservoir rock over time. The pressure and flow distributions may be determined throughout the well piping or the well annulus depending whether the well is flowed back through the casing and production tubing, or through the casing if the well is flown back before installation of the production tubing or the pressure might be determined throughout the annulus between the wellbore and the piping if the well is flown back through the annulus.

The drawdown pressure, and, thus, the flow rate of the fluid flowing in the well 200 to the surface 201, can be adjusted by a surface-located wellhead choke 216 disposed at or near the tubing head 212. For example, the choke 216 can be throttled up whereby the aperture of the choke 216 is increased or opened in order to increase the drawdown pressure and increase the flow rate of the fluid flowing in the well 200 to the surface 201. In another example, the choke 216 can be throttled down whereby the aperture of the choke 216 is decreased or closed in order to decrease the drawdown pressure and decrease the flow rate of the fluid flowing in the well 200 to the surface 201.

After a hydraulic fracturing treatment, and before the production of hydrocarbons can commence, the hydraulic fluid injected into the reservoir must be at least partially removed from the reservoir as part of flowback fluids that flow to the surface 201 for collection and transport. As used herein "flowback fluid(s)" include one or more of oil, water, gas, and solids, and mixtures thereof. The flow rate of flowback fluid to the surface 201 is termed the "unloading rate." Generally, it is desirable to remove the flowback fluid from the reservoir as quickly as possible (i.e., a high unloading rate) so that the well 200 can begin to produce hydrocarbons. However, if the flowback fluid is withdrawn too quickly (i.e., if the unloading rate is too high), there is a risk of unwanted conditions including tensile rock failure, excessive proppant flowback and fines migration. Moreover, because the flowback operation is a highly transient process, in which the distributions of properties change rapidly, it is important to be able to determine the evolution of these properties over time so that operational corrections can be made to manage the flowback operation efficiently and with reduced risk of damage to the well and the reservoir.

Figure 3:
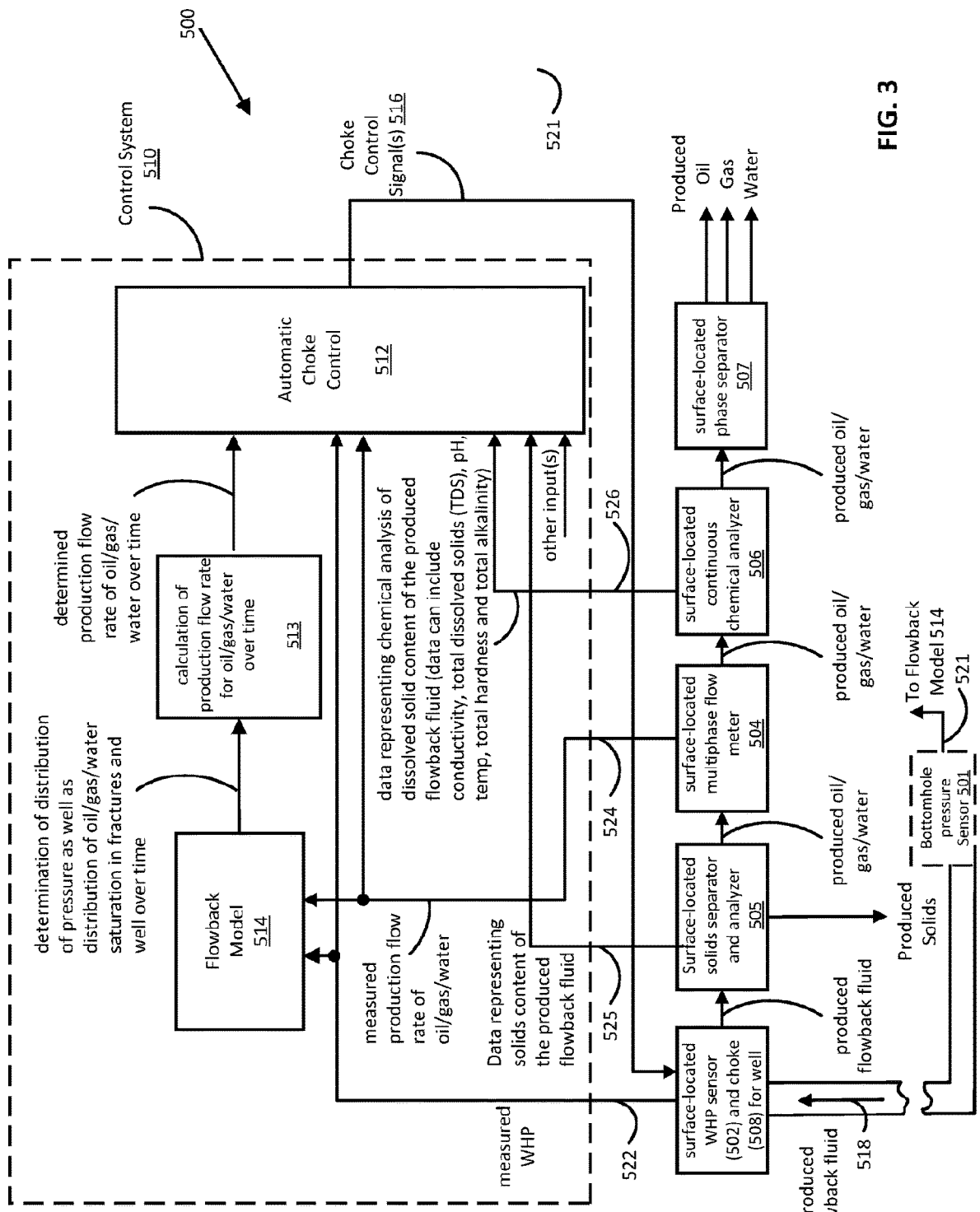
FIG. 3 is a schematic illustration of an embodiment of a flowback system according to the present disclosure.
Figure 13:
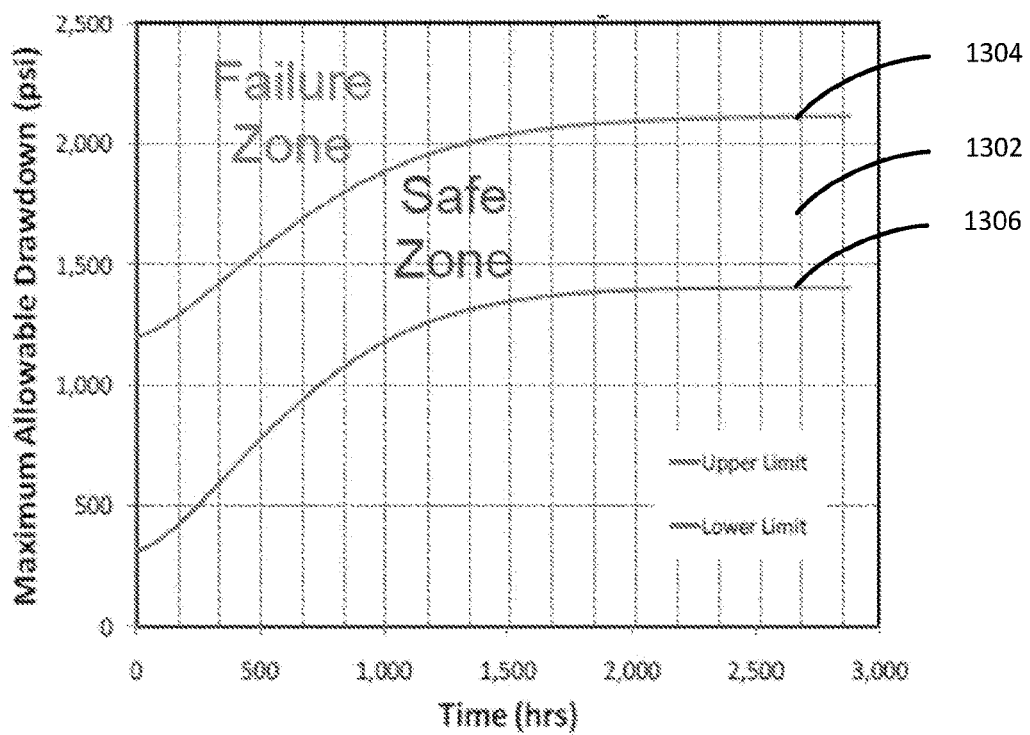
FIG. 13 is an example graph of scheduled maximum allowable drawdown pressure versus time during an exemplary flowback operation.

FIG. 3 illustrates an embodiment of a real-time flowback system 500 that has a plurality of sensors (including a well head pressure sensor 502, a multiphase flow meter 504, a solids analyzer 505, and a chemical analyzer 506), a wellhead choke 508, and a control system 510 that dynamically controls the operation of the choke 508 based upon a plurality of inputs from the sensors 502, 504, 505, and 506. An optional bottomhole pressure sensor 501 may also be included. The control system 510 includes a controller 512 that employs a flowback model 514. The control system 510 processes the plurality of inputs to generate an output that includes a choke control signal 516 that is used by the choke 508 to control the drawdown pressure and flow rate of produced flowback fluid 518 during a flowback operation. The control system 510 can be configured to control the drawdown pressure and flow so that the drawdown pressure remains at or below the scheduled maximum allowable drawdown pressure, such as illustrated in FIG. 13, for example. By controlling the drawdown pressure over time, the above-noted unwanted conditions (including tensile rock failure, excessive proppant flowback, fines migration) can be mitigated if determined or detected by the control system 510, as will be discussed in greater detail below. All of the blocks of the system 500, including the measurements obtained by sensors 502, 504, 505, 506, and 507, and the processing carried out by the control system 510 to control the choke 508, may occur in real-time.

The control system 510 interfaces to the choke 508 via wired or wireless signal paths therebetween in order to communicate the choke control signal 516 that controls the operation of the choke 508. The control system 510 interfaces to wellhead pressure sensor 502 via wired or wireless signal paths therebetween to receive data measurements of wellhead pressure. The control system 510 interfaces to multiphase flow meter 504 via wired or wireless signal paths therebetween in order to receive data measurements of production flow rates of oil/gas/water. The control system 510 interfaces to solids analyzer 505 via wired or wireless signal paths therebetween in order to receive data representing the type and amount of solids produced from the flowback fluid. The control system 510 interfaces to continuous chemical analyzer 506 via wired or wireless signal paths therebetween in order to receive data representing chemical analysis of solid content of the produced oil/gas/water over time, as discussed below.

The control system 510 can be configured to carry out a sequence of calculations and operations to control the drawdown pressure and the flow rate of the flowback fluid by controlling the operation of the choke 508. The control logic can be configured by user input or other suitable data structure, which is used to configure the control system 510 in order to carry out control operations that are part of the workflow as described herein. For example, the user input or other suitable data structure can specify parameters (such as pressures, flow rates, temperatures, etc.) for such control operations of the workflow.

The choke 508 may include a variable sized aperture or orifice that is used to control fluid flow rate or downstream system pressure. As an example, the choke 508 may be provided in any of a variety of configurations (e.g., for fixed and/or adjustable modes of operation). As an example, an adjustable choke 508 may enable fluid flow and pressure parameters to be changed to suit process or production requirements. As an example, a fixed choke may be configured for resistance to erosion under prolonged operation or production of abrasive fluids. The choke 508 may be electrically or pneumatically operated.

Flowback System Sensors

In one embodiment the flowback system 500 may include a wellhead pressure (WHP) sensor 502, a multiphase flow meter 504, a solids analyzer 505, and one or more continuous chemical analyzers 506. As noted above, the flowback system 500 may include an optional bottomhole pressure sensor 501. The sensors 502, 504, 505, and 506 may be located on the surface, while the bottomhole pressure sensor 501 may be located at one or more designated bottomhole locations along the well.

The bottomhole pressure sensor 501 is configured to provide real-time bottomhole pressure measurements 521 to the control system 510, which may be used to control the drawdown pressure and the choke 508. Also, the bottomhole pressure measurements 521 of the bottomhole pressure sensor 501 may be used to tune the flowback model 514 and to validate the downhole pressure(s) determined by the flowback model 514, if need be.

The wellhead pressure (WHP) sensor 502 is configured to measure the pressure of the flowback fluid at the wellhead. The wellhead pressure sensor 502 is communicatively coupled to the control system 510 and is configured to output a pressure signal 522 that characterizes the pressure of the flowback fluid at the wellhead to the control system 510.

The flowback fluid passes by the WHP sensor 502 and on through a surface-located solids separator and analyzer 505. The solids separator and analyzer 505 receives the produced flowback fluid and separates that fluid into two streams: a stream of produced solids; and a stream of produced oil/gas/water. The produced solids are collected and analyzed by the analyzer 505, while the stream of produced oil/gas/water passes to the surface-located multiphase flow meter 504. The analyzer 505 can be configured to characterize the solids content (e.g., amount of different solids types, such as proppant, formation rock, fines, etc.) that are included in the flowback fluid in real time. The solids content of the flowback fluid may include any of proppant, formation rock, and possibly fines. The analyzer 505 is communicatively coupled to the control system 510 and is configured to output solids content measurement signals 525 of the produced fluids to the control system 510. In embodiments, the solid analyzer suitable within the present disclosure includes continuous in line devices such as clamp-on gauges, an example of commercially available device is ClampOn provided by ClampOn Inc., Houston, Tex.; continuous in line devices such as densitometers; Continuous measuring devices such as Vx multi-phase flowmeter commercially available from Schlumberger Limited; or non-continuous measurement devices such as separators.

The multiphase flow meter 504 is configured to measure flow rates of the various phases (oil/gas/water) of the stream of produced fluids in real time. In one embodiment, the multiphase flow meter 504 may be a Model Vx Spectra multiphase flow meter supplied by Schlumberger Limited of Sugarland, Tex. The multiphase flow meter 504 is communicatively coupled to the control system 510 and is configured to output flow rate measurement signals 524 for the oil/gas/water phases of the produced fluids to the control system 510.

The stream of produced fluids passes through the multiphase flow meter 504 to the surface-located continuous chemical analyzer 506. The continuous chemical analyzer 506 is configured to continuously analyze the produced oil/gas/water and to generate data representing chemical analyses of those fluids over time, examples of chemical analysis may include electrical conductivity measurements using capacitive type devices; pH detection using ion selective electrodes, solid state detectors, or spectrophometric methods; flow-through spectrophotometric and Infra-red spectroscopy cells; ion selective electrodes for specific ions, gas chromatography, gas detectors. The data may include conductivity, total dissolved solids (TDS), pH, temperature, total hardness, and total alkalinity. Additional water samples can also be collected and preserved for validation of field measurements in a lab and for detailed analysis for elements such as calcium, magnesium, barium, strontium, sulfate, and sulfide, for extended scaling potential analysis and safety hazards. The continuous chemical analyzer 506 is communicatively coupled to the control system 510 and is configured to output the afore-mentioned measurement signals 526 to the control system 510.

The stream of produced fluids passes through the continuous chemical analyzer 506 to a surface-located phase separator 507, which is configured to separate the stream of produced oil/gas/water into separate streams of oil, gas, and water, which can be individually collected for storage and/or transport. Also, the separator 507 may also be used for measuring flow rates of the oil/gas/water.

A flowback model 514 can use the pressure signal 522 and the flow measurements 524 to operate as a transient fluid flow simulator that predicts transient pressure distributions along the well and along hydraulic fractures in the reservoir and that predicts distributions of oil/gas/water saturations along the well and along the hydraulic fractures. Those predictions may be used to calculate determined production flow rates for oil/water/gas over time at block 513. The flowback model 514 can also possibly determine solid concentration and other properties in fractures and along the well. The flowback model 514 can also be used to characterize the bottomhole pressure and associated drawdown pressure of the well over time. The calculated production flow rates, other properties, and drawdown pressure over time may be used by the automatic choke control 512 for use in generating the choke control signal 516.

In some embodiments, the bottomhole pressure may be calculated based on a plurality of surface measurements (e.g., wellhead pressure and multiphase flow rates) taken over time. For example, in the case of significant fluid travel time from the bottomhole location to the surface, the actual distribution of fluid composition in the wellbore may not be known. In such a case, the distributions and bottomhole conditions at each moment in time may be extrapolated from prior known measurements of multi-phase surface flow measurements measured at the surface, and parameters of such extrapolation can be later verified and additionally calibrated after the bottomhole fluid reaches the surface. Optionally, the bottomhole pressure may be measured from the bottomhole pressure sensor 501. In this configuration, the bottomhole pressure measurement may be compared to the bottomhole pressure determined by the flowback model in order to validate the flowback model.

Figure 10:
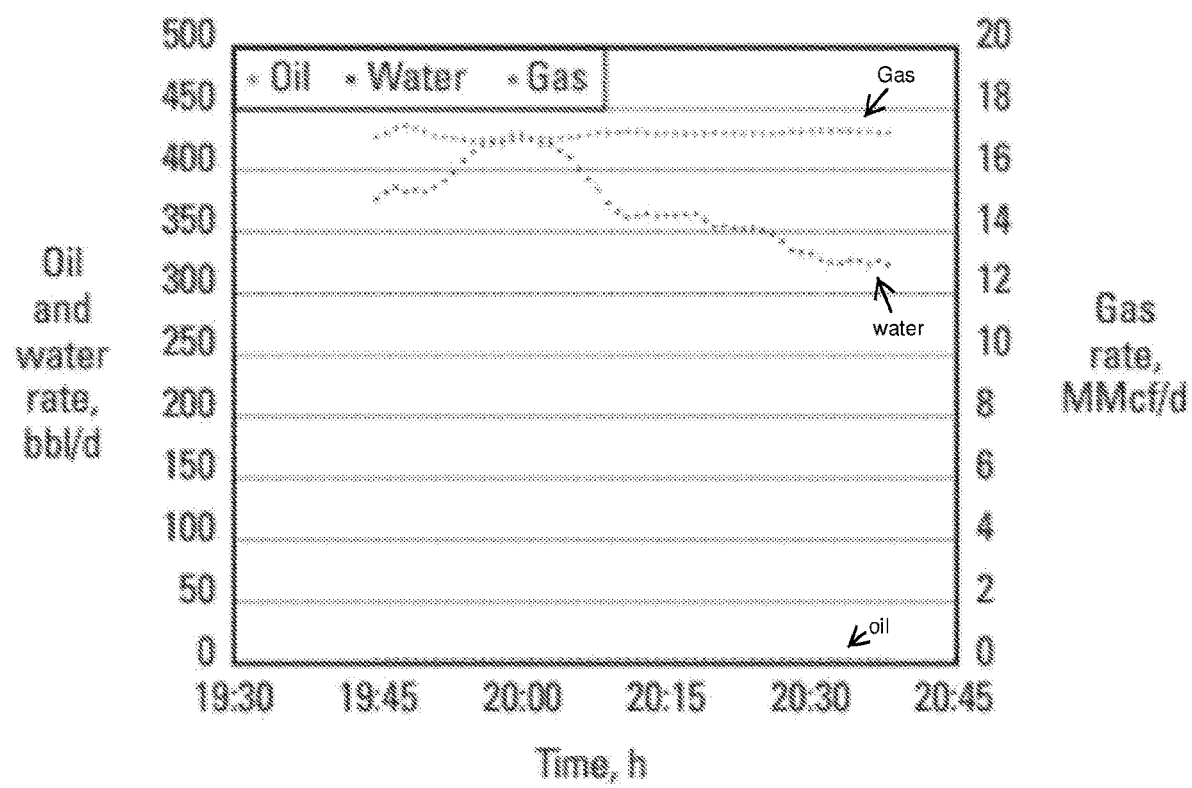
FIG. 10 is a graph of multiphase flow of oil, water, and gas versus time during an exemplary flowback operation.

The flow rates of each phase of the flowback fluid (i.e., oil, gas, water, and solids) may be measured continuously using the multiphase flow meter 504 and may also be determined over time using the output of the flowback model 514 for comparison with the measured values. For example, see the description of block 515 in FIG. 4 that follows. FIG. 10 shows a plot of flow rates of oil/water/gas over time that are determined by the control system 510 using the output of the flow model 514.

The control system 510 can be configured to receive and process measurements from the plurality of sensors 502, 504, 505, and 506 and to dynamically adjust the operation of the choke (e.g., regulate the aperture of the choke) based on the measured properties of the flowback fluid. The control system can also be configured to dynamically adjust the operation of the choke 508 based on determined conditions and/or calculations derived from the flowback model 514.

In one embodiment, the multiphase flow rates that are calculated at block 513 are updated in real time based on real time updates of fluid properties determined by the model 514. The updated calculated multiphase flow rates are compared in real time to the measured multiphase flow rates. If the determined multiphase flow rates match the measured multiphase flow rates, then the flowback model 514 is validated and the model 514 may be used to determine the properties of the fluid column in the well between the surface located choke 508 and a bottomhole location, including bottomhole pressure at the bottomhole location. If the determined multiphase flow rates do not match the measured multiphase flow rates, then the model 514 may be tuned at block 520 (FIG. 4) so that the flowback model 514 may be updated in real time such that the determined multiphase flow rates match the measured multiphase flow rates, and then the flowback model 514 can be used to determine the properties of the fluid column in the well including bottomhole pressure.

In another embodiment, a number of different flowback models 514 (each initialized to reflect different flowback scenarios) may be implemented concurrently. In this case, each model produces a corresponding set of determined multiphase flow rates at block 513. Thus, multiple sets of determined flow rates may be compared against the measured multiphase flow rates to identify one of the flowback models that best matches the measured multiphase flow rate values. The selected flowback model may then be used to determine the fluid column properties in the well, including bottomhole pressure.

In yet another embodiment, the bottomhole pressure may be calculated based on a plurality of surface measurements, taken over time, of pressure (e.g., WHP) and flow rates (e.g., multiphase flows). For example, in the case of significant fluid travel time from the bottomhole location to the surface, the actual distribution of fluid composition in the wellbore may not be known. In such a case, the distributions and bottomhole conditions (e.g., bottomhole pressure) at each moment in time may be extrapolated from prior known measurements of multi-phase surface flow measurements measured at the surface, and parameters of such extrapolation can be later verified and additionally calibrated after the bottomhole fluid reaches the surface. Optionally, the bottomhole pressure may be measured from the bottomhole pressure sensor 501 and used to calculate drawdown pressure. Furthermore, the bottomhole pressure measurements may be compared to the bottomhole pressure determined by the flowback model for tuning the flowback model and for validation of the flowback model if need be.

In still another embodiment, the flowback model(s) as described above can be used to determine multiple estimates of bottomhole pressure over time and provide a statistical distribution of the bottomhole pressure over time (e.g., a maximum, minimum, average, and standard deviation). Furthermore, deviation from a determined trend or scenario, such as deviation from a predefined drawdown operating envelope, can be reported as an alarm for further analysis and decision making for updating the flowback strategy.

Control System—Automatic Choke Control

Figure 4:
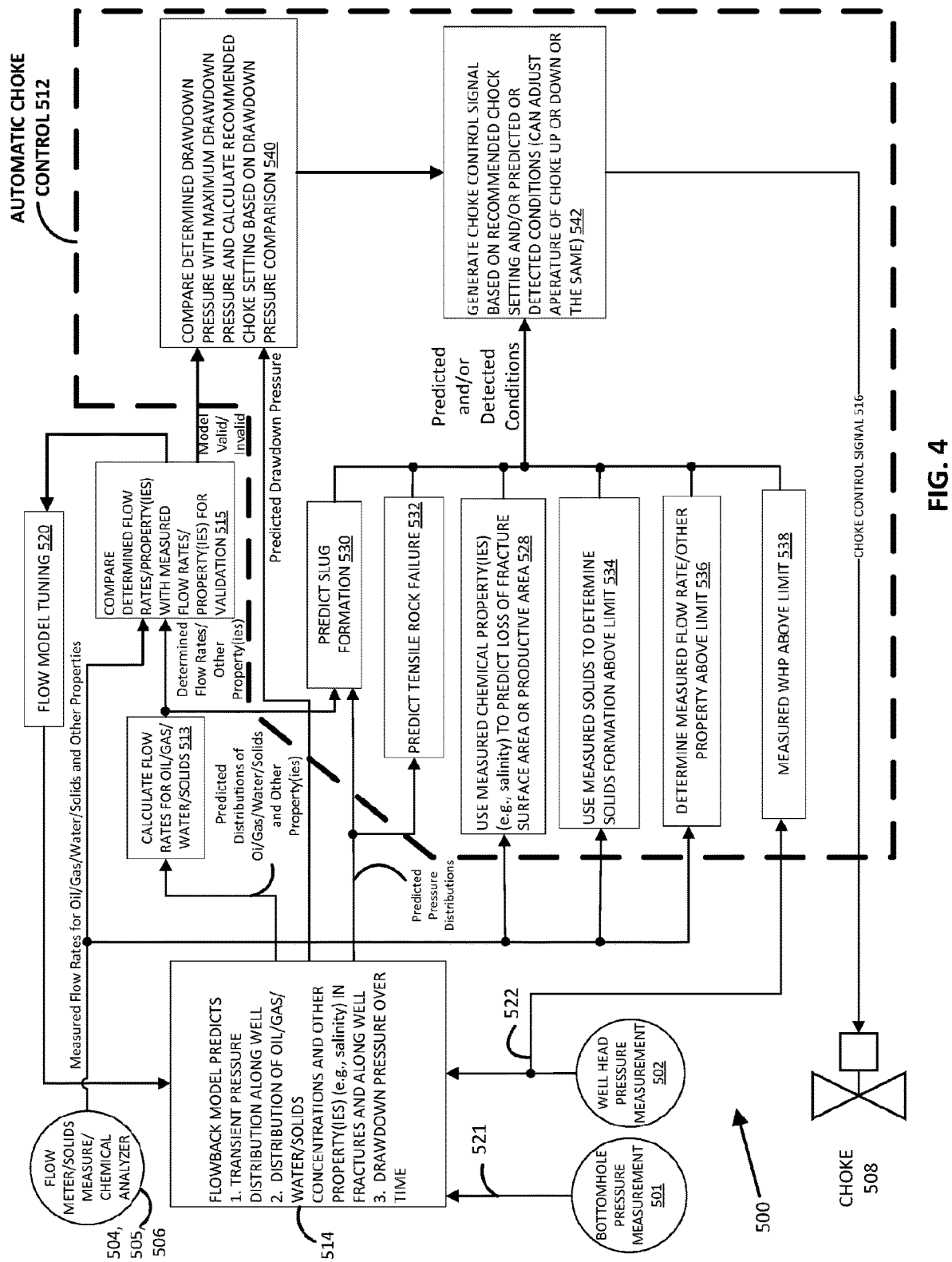
FIG. 4 is a schematic illustration of exemplary data flow and associated calculations within the flowback system of FIG. 3.

FIG. 4 shows an exemplary data flow and associated calculations within the flowback system of FIG. 3. At block 515, the determined multiphase fluid flow rates at the surface may be compared with the corresponding measured multiphase flow rates output by the multiphase flow meter 504. At block 520 at least some of the flowback model parameters in FIG. 7 may be tuned or refined based on the comparison of the measured and target flow rates at block 515. Also, a validation signal (i.e., valid or invalid) may be output to the choke controller 512 based on the comparison at block 515. The validation signal may be used by the choke controller 512 to denote whether or not the flowback model is valid. In the cases where the model is invalid, a safe mode of operation is followed until the model can be tuned and valid. As an example, such safe mode comprises keeping the current choke setting along unless surface measurements from solids/fluids indicate that the current choke settings corresponds to a danger zone of the system (e.g. a large amount of fines being produced).

In block 540, the automatic choke control 512 is configured to maintain a controlled drawdown pressure of the well over time as determined by the output of the flowback model 514 in order to generate a recommended choke control setting. In blocks 528 to 538 the automatic choke control 512 may receive input 522 from the wellhead pressure sensor 502, input 524 from the multiphase flow meter 504, an input 525 from the solids analyzer 505, input 526 from the continuous chemical analyzer 506, as well as other inputs from the flowback model 514 and possibly other sources that are used to detect and/or determine unwanted conditions such as sand, salinity, temperature, gas saturations, or oil saturations changes.

In block 542, the automatic choke control 512 can generate a choke control signal 516 based on the recommended choke control setting derived from the drawdown pressure analysis 540 or a choke control signal suitable for addressing the unwanted condition(s) determined or detected in blocks 528 to 538. In this manner, the recommend choke setting recommended in block 540 may be overridden with another suitable choke settings if there is a prediction or measurement indicative of unwanted conditions such as damage to the well. For example, if rock failure, slug formation, fracture surface area loss, insufficient flow to lift the liquids and/or solids or excessive formation solids are determined or detected, then the choke controller 512 may override the choke setting recommendation from block 540 and generate an alternative choke control signal at block 542 to adjust the choke 508 based on the specific failure condition(s) that is determined or detected. For example each overridden choke control signal may be predefined and stored in a lookup table accessible to the automatic choke control 512. Moreover, if more than one failure condition is detected or determined, the overridden choke control signal may be based on a predefined priority schedule. For example, any overridden choke control signal output from block 542 may be based on the most dangerous failure condition determined or detected.

However, if there are no determined or detected failure conditions damage, then the choke control signal recommendation from block 542 is not overridden at block 542 and the choke control setting is generated at block 542 based on the choke control signal recommendation of block 540.

In one embodiment, the flowback model 514 can include certain parameters related to near wellbore fractures, such as unpropped fracture area and/or fracture conductivity in the near wellbore region. Note that fracture conductivity is based upon the propped fracture width and permeability of the proppant. A safe drawdown envelope can be estimated based on the flowback model 514 using these certain parameters together with reservoir mechanical and hydraulic properties. The safe drawdown envelope can be defined such that it avoids tensile failure of the formation. In this configuration, the solids content of the flowback fluid (e.g., the amount of different types of solids such as proppant, formation rock, fines, etc.) as measured by the solids analyzer 505 can be compared against predefined threshold levels (which can be derived from historical data of produced solids in similar or like wells or other methods) in order to identify a change in the parameters related to near wellbore fractures. The flowback model 514 can then be dynamically updated to accommodate the identified change in the parameters related to near wellbore fractures. The updated flowback model 514 can then used to dynamically update the safe drawdown envelope (e.g., safe zone depicted in FIG. 13) such that it accounts for the change in near wellbore fractures over time during the flowback operations. Thus, the control scheme is linked to the behavior of the fractures in the near wellbore region, captures the uncertainties of the fracture properties in the near wellbore region, and computes safe operating envelopes for flowback and early production. The comparison of the solids content of the flowback fluid and the predefined threshold levels can also be used to identify risks of fracture failure and pinchout. Upon identifying any of these conditions, the choke control signal 516 can be dynamically adjusted such that it mitigates the detected condition(s).

Chemical Analyses

At block 528 in FIG. 4, the output 526 of the chemical analyzer 506 may be used to determine a loss of fracture surface area or productive area in the formation. The choke setting recommendation from block 540 may be overridden based on the prediction of loss of fracture surface area or productive area in the formation.

Chemical analysis of the produced oil/gas/water may be used to monitor how the chemistry of the fracturing fluid changes over the flowback period as a result of its contact with a stimulated reservoir. Continuous monitoring of parameters such as conductivity, total dissolved solids (TDS), pH, temperature, total hardness, and total alkalinity may provide insight regarding the rock-fluid interaction. The measurements of temperature, pH, total hardness, and total alkalinity obtained by the chemical analyzer 506 relate to precipitate potential production of impairing minerals, and an understanding of these parameters can assist in understanding scaling potential. Thus, in one embodiment, if scale formation is measured or determined, and the amount of scale is determined to be excessive, the choke controller may be configured to generate a choke control signal to set the orifice size smaller or to close the choke.

Figure 14:
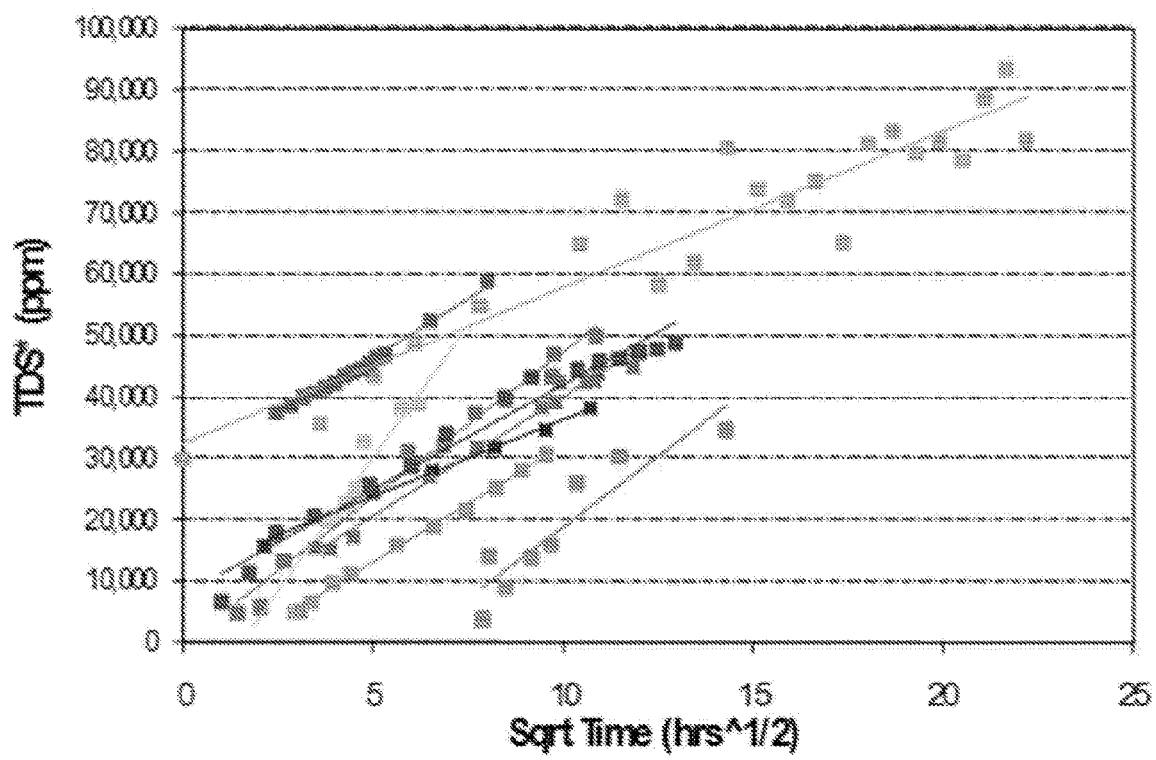
FIG. 14 is a graph of total dissolved solids in produced flowback fluid versus time for various wells.

Also, the salinity (or a single ionic species such as chloride) that is measured during flowback is directly linked to the reservoir that is connected to the producing hydraulic fracture network (HFN). Each sample of the flowback fluid is essentially a distinct measurement in time of the equilibration process between the fracturing fluid and the formation chemistry. In embodiments, continuous salinity measurements may also be performed. FIG. 14 shows plots of measurements of total dissolved solids (TDS) in the flowback fluid as a function of $time^{1/2}$ for a plurality of wells. As shown in FIG. 14, each plot steadily increases, and is expected to reach an asymptote at salt concentration close to that of the native reservoir conditions. This is likely a reflection of the fracture aperture distribution along the radial flow paths in FIG. 11A and its signature may also indicate regional distributions due to rock type changes. These curves of salinity vs. $time^{1/2}$, have been observed to be similar for similar sized completions in the same formation and in the same field. As such they can be used as type curves for interpreting data acquired for new wells. If during the flowback from new wells, rapid, or otherwise unexpected changes in the graph or slope of the salinity vs. $time^{1/2}$ curves could indicate loss of connected fracture surfaces area. Therefore these curves, correlated with wellhead (and calculated bottomhole) pressure data, can be used as input for the choke control system.

The above-mentioned equilibration can be observed by taking multiple samples of these flowback fluids over time, and a change in the pattern of the chemistry evolution (e.g., change in chlorides slope vs. $time^{1/2}$) would indicate a change in the chemistry that was coming to equilibration with the fracturing fluid. This could be due to a change in geometry (e.g., losing connectivity with the chemistry contributed from a zone), or this could be an event brought about by crossing a pressure threshold (e.g., influx of produced fluids from an underpressured section of the reservoir). Thus, in one embodiment, the choke control signal generated by the choke controller at block 624 in FIG. 6 may be based on a change in slope of the ionic strength, salinity, chlorides salt concentrations, etc. as a function of $time^{1/2}$.

Slug Formation

As shown in FIG. 4, at block 530, if slug formation or slug flow is determined, an override choke setting may be generated to override the choke setting recommendation of block 540. The term "slug flow" relates to a multiphase-fluid flow regime characterized by a series of liquid plugs (slugs) separated by a relatively large gas pockets. The resulting flow alternates between high-liquid and high-gas composition. The presence of slug flow may indicate a condition that is damaging to fractures in the formation. Slug formation can be determined from the calculated flow rates and the modeled pressure distributions. The frequency of determined slugs may be monitored and based on that frequency, the recommended choke setting may be overridden to change the choke setting to alter the frequency in a case where it is determined that the frequency of the slugs is damaging the fractures. Particular methodologies for predicting slug formations are described below with respect to FIGS. 15 to 17. In some cases, the model may determine that slug flow is beneficial and the choke would be adjusted accordingly over variable periods of limited durations. In yet further cases, constant slug flow may be encouraged during the flowback operations if other failure modes are not triggered or have limited negative impact.

Tensile Rock Failure

At block 532 the automatic choke control 512 may determine tensile rock failure and generate an override choke setting based on the determined pressure distributions from the flowback model 514. Tensile rock failure relates to breakage of the formation rock and is a function of the propped fracture width, the size of the near-wellbore area devoid of proppant, the closure stress, the reservoir pressure, the pressure in the wellbore in front of the fracture, the elastic properties and tensile strength of the rock (to be calibrated) and the pressure history in the wellbore in front of the fracture. Tensile failure occurs if a difference between the stress and the fluid pressure in the formation exceeds an effective formation tensile strength.

As noted above, tensile rock failure of the reservoir rock may be determined based on the above-mentioned modeled pressure distributions in the reservoir. Also, the risk of tensile rock failure may be based on the type of reservoir rock. If tensile rock failure is determined and formation failure has been identified as a high impact risk for the well, then the override choke setting from block 532 may include a setting to throttle the choke 508 further so that the downhole pressure is increased for a time that allows the pressure transient in the formation to dissipate.

Solids Formation

The recommended choke setting from block 540 may also be overridden if it is determined at block 534 that the measured solids content of the flowback fluid exceeds a predetermined threshold. The measured solids content is based on the output of the solids analyzer 505. If the threshold is exceeded, then a suitable choke control signal that is intended to reduce the solids content in the flowback fluid can be generated at block 542 and supplied to the choke 508.

Particle concentrations may be monitored during flowback operations by the solids analyzer 505. In one embodiment a continuous solids monitoring acoustic device is used to monitor and determine if solids are being produced at all, if the solids flow rate is continuous or if the solids rate increases at some stages and then stabilizes or disappears. In addition, as part of the solids monitoring process, several samples of solids can be collected in the field to be sent for lab analysis to then define what types of solids were produced (i.e. formation-like solids, precipitation scale or proppant). Some on site analysis may be done depending on the complexity and available technologies.

Solids in the flowback fluid may come from the fracture (proppant) and/or from the formation (through formation failure) or even from the wellbore if prior operations did not leave the drain cleared. The presence of proppant in the flowback fluid at the surface may indicate reduction of fracture apertures and the possibility of bed formation in the undulating parts of the horizontal sections of the well piping (e.g., the production liner 210 of FIG. 1). Also, the presence of formation rock in the flowback fluid at the surface may indicate damage to the formation reservoir and propped fracture network.

If reservoir rock is detected, a decision can be made about whether a threshold indicative of damage to the formation reservoir and fracture network has been reached based on both a combination of rate of production of those solids and total amount produced. If proppant is detected, a decision can be made about whether a threshold indicative of damage to the fracture apertures has been reached based on the rate of production and total amount of proppant produced, which can be used to estimate the fraction of proppant returned to the surface. Thus, in one embodiment, the override choke control signal generated at block 542 may be based on the measurement of the amount of proppant and/or formation rock returned to the surface. For sand or proppant production, the difference between closure pressure and bottomhole pressure may be monitored to determine if a threshold is exceeded. The closure pressure data may be determined from a post fracture job analysis. In one embodiment, if the difference between closure pressure and bottomhole pressure exceeds a threshold, then the override choke control signal may be generated at block 542, and if the difference is less than the threshold, an override choke control signal may not be generated at block 542.

Even if the solids production is not severe enough (above the respective thresholds discussed above) to be indicative of damage to the fractures or to the formation rock, the solids production may still pose problems for production facilities and pipeline components on the surface. For example, the solids production rate may cause problems for the production facilities and the total amount of solids produced may be a problem for filling traps and filters.

Flow Measurements

At block 536 a determination is made whether one or more measured flow rates measured by the multiphase flow meter 504 is above a predefined limit. If the limit is exceeded, then a suitable choke control signal setting to override the recommended choke setting of block 540. As an example, if the flow rate of water exceeds a predetermined limit, then a suitable choke control signal that is intended to reduce the flow rate of water can be generated at block 542 and supplied to the choke 508. Erosion probes may provide relevant information about the extent of the potential damages and dynamics of the erosion of the production system.

Wellhead Pressure

At block 538 a determination is made whether the wellhead pressure is above or below a predefined limit. For example, above a certain limit could correspond to not having enough flow and loading the well with water, while below a certain limit could correspond to some kind of formation failure (e.g. perforation collapse). If the limit is exceeded, then a suitable choke control signal that is intended to reduce the wellhead pressure can be generated at block 542 and supplied to the choke 508.

While not shown explicitly in FIG. 4, flowback data from other neighboring wells may be used as part of the control scheme carried out by the automatic choke control 512. For example, such flowback data can be used to derive one or more of the threshold limits for predicting or detecting the conditions in blocks 528 to 538, as described above.

One problem with wellhead measurements is that the wellbore storage of fluids causes water, hydrocarbon fluids, and solid production rates at the surface to lag behind the changes to bottomhole pressure that cause such production rate changes at the surface. Pressure information travels at the speed of sound, so that pressure events at a bottomhole location generate a corresponding signal at the wellhead only a few seconds later. However, the corresponding change in the bulk flow of material (water, hydrocarbons, and solids) that accompanies that pressure event, will arrive at the surface minutes to hours later. For example, if the well piping volume is two hundred barrels, and the nominal flowback rate is fifty barrels per hour, then the measured flowrate data reflects what occurred three to four hours previously. In order to account for this inherent production lag time caused by wellbore storage of fluids, the control system 510 may be configured to calculate the lag time period between a wellhead pressure change (with corresponding downhole pressure change) and a corresponding change to the production flow rates of fluids and solids at the surface due to the wellbore storage of fluids. This lag time can be used to dynamically correlate the wellhead pressure data 502 (with the corresponding determined or measured bottomhole pressure data) over time to fluids and solids production rates at the surface over time. Also, the control system 510 may be configured to dynamically adjust the choke control setting based on such correlations.

The calculations of the flowback model 514 in determining the pressures and fluid compositions in the well including bottomhole pressure and other bottomhole conditions can involve a wide variety of data, including a set point or other predefined parameter, data from at least one other well, data characterizing mineralogy of the hydraulically fractured reservoir, data derived during drilling the well, etc.

Also note that previously acquired flowback and production data from at least one other well can be used to tune the flowback model 514. Such other well(s) may be geographically nearby (i.e., in the same basin) the well that is undergoing flowback operations. Alternatively, such other well(s) may be located in other basins having similar properties to that of the well that is undergoing flowback operations. In those cases, the flowback model 514 is more likely to be more predictive. Previously acquired and stored flowback data from such other well(s) may assist in providing a calibrated control loop where bottomhole pressure upper and lower bounds are estimated to define a safe flowback operational envelope for other subsequent wells. Using a control flow loop that uses historical field data to enhance the current data set may lead to better predictions of bottomhole pressure than can be made before actual separator and fluid composition data is obtained.

Figure 5:
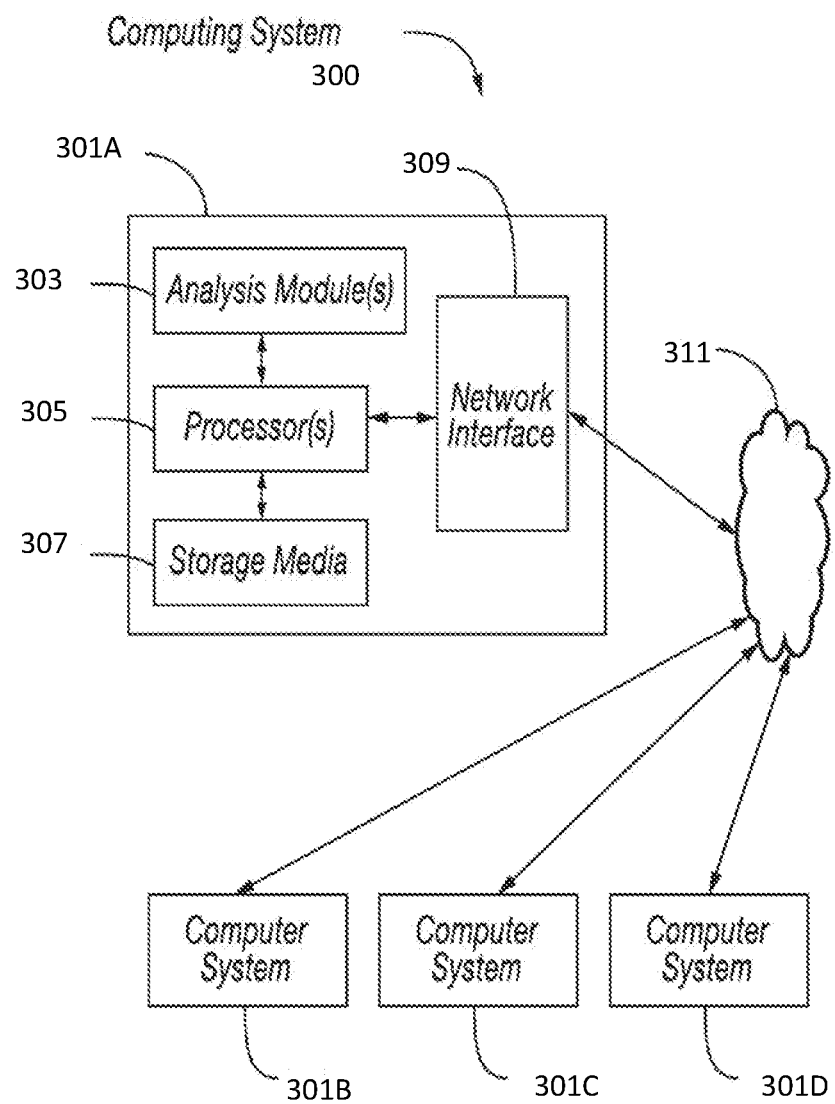
FIG. 5 shows an example computing system that can be used to implement the flowback system or parts thereof of FIGS. 3 and 4.

FIG. 5 shows an example computing system 300 that can be used to implement the control system 510 or parts thereof. The computing system 300 can be an individual computer system 301A or an arrangement of distributed computer systems. The computer system 301A includes one or more analysis modules 303 (a program of computer-executable instructions and associated data) that can be configured to perform various tasks according to some embodiments, such as the tasks described above. To perform these various tasks, an analysis module 303 executes on one or more processors 305, which is (or are) connected to one or more storage media 307. The processor(s) 305 is (or are) also connected to a network interface 309 to allow the computer system 301A to communicate over a data network 311 with one or more additional computer systems and/or computing systems, such as 301B, 301C, and/or 301D. Note that computer systems 301B, 301C and/or 301D may or may not share the same architecture as computer system 301A, and may be located in different physical locations.

The processor 305 can include at least a microprocessor, microcontroller, processor module or subsystem, programmable integrated circuit, programmable gate array, digital signal processor (DSP), or another control or computing device.

The storage media 307 can be implemented as one or more non-transitory computer-readable or machine-readable storage media. Note that while in the embodiment of FIG. 5, the storage media 307 is depicted as within computer system 301A, in some embodiments, storage media 307 may be distributed within and/or across multiple internal and/or external enclosures of computing system 301A and/or additional computing systems. Storage media 307 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 303 can be provided on one computer-readable or machine-readable storage medium of the storage media 307, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 300 is only one example of a computing system, and that computing system 300 may have more or fewer components than shown, may combine additional components not depicted in the embodiment of FIG. 5, and/or computing system 300 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the operations of the workflow described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

Control System—Flowback Model

Figure 6:
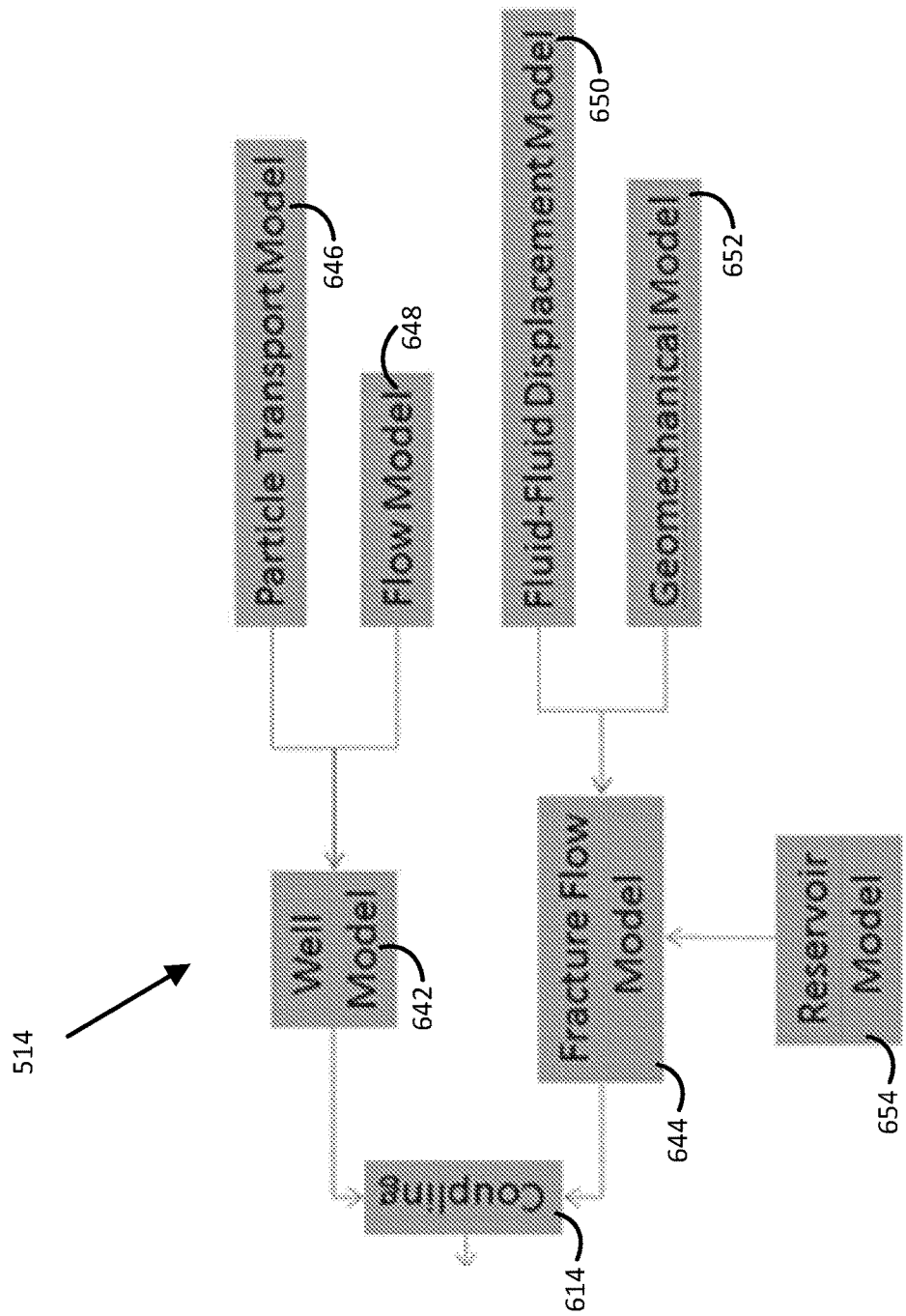
FIG. 6 is a schematic representation of the component parts of an exemplary flowback model.

FIG. 6 illustrates an embodiment of the flowback model 514 including sub-models that may be used as part of the flowback model 514. The flowback model 514 is a system of mathematical equations that characterize the pressure distributions and fluid flow in the hydraulically fractured reservoir rock and the well piping over time as a function of wellhead pressure. Specifically, the flowback model 514 includes coupling logic 614 that joins a well model 642 and a fracture flow model 644.

The well model 642 models the flow of flowback fluid in the well piping over time as a function of wellhead pressure. The well model 642 receives input from a particle transport model 646 and a flow model 648. The particle transport model 646 models the movement of solid particles along the well and the flow model 648 models the movement of fluids along the well.

The fracture flow model 644 models the flow of flowback fluid in the hydraulically fractured reservoir rock over time as a function of wellhead pressure. The fracture flow model 644 receives input from a fluid-fluid displacement model 650 within the fractures, a geomechanical model 652 of geomechanical properties of the formation rock, and reservoir model 654 that models the inflow of fluid into the fractures. The geomechanical model 652 models the interaction between the formation's rocks, stresses, pressures, and temperatures and the influence of these parameters on the fractures. The fluid-fluid displacement model 650 models the displacement of oil, gas, and water by hydraulic fracturing fluid in the reservoir rock and/or the displacement of the hydraulic fracturing fluid be the reservoir fluids. The reservoir model 654 models the physical space of the reservoir (e.g., reservoir 202 of FIG. 2) by an array of discrete cells, delineated by a grid, which may be regular or irregular. The array of cells is usually three-dimensional, although one-dimensional and two-dimensional models can be used. Values for attributes such as porosity, permeability and water saturation are associated with each cell. The value of each attribute is implicitly deemed to apply uniformly throughout the volume of the reservoir represented by the cell.

The flowback model 514 may have a plurality of input parameters. As shown in an example in FIG. 7, the flowback model 514 may have seventeen input parameters related to fractures, the reservoir, the wellbore layout and geometry and completion layout and geometry, and fluids expected to flow in the well.

Figures 8, 9:
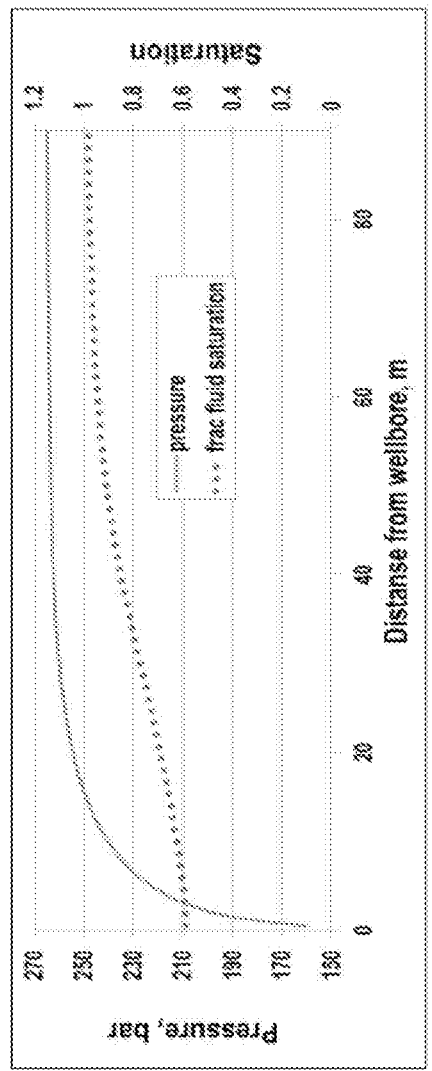
FIG. 8 is a table showing output parameters for an illustrative flowback model.
FIG. 9 is a graph of reservoir pressure and fracture fluid saturation versus radial distance from the wellbore at a respective location along a well.

Also, as shown in an example in FIG. 8, the flowback model 514 may have a plurality of outputs that vary with time including: a one-dimensional (radial direction from the wellbore) pressure distribution along fractures; one-dimensional fluid saturation distributions for oil/gas/water along fractures; a one-dimensional pressure distribution along the length of the well to the surface; and one-dimensional fluid saturation distributions for oil/gas/water along the length of the well to the surface. This pressure distribution along the length of the well over time can be used to characterize the bottomhole pressure over time. Also, the one-dimensional radial distributions of pressure and fluid saturations along the fractures can be modeled at various locations (e.g., in perforation zones 220) along the well. A visual representation of the one-dimensional pressure and fluid saturation distributions is shown in FIG. 9 as a function of radial distance from the wellbore.

The flowback model 514 can solve for pressure drop (e.g., pressure differential) in the well, for example, through use of momentum equations. Such momentum equations, for example, may account for factors such as fluid potential energy (e.g., hydrostatic pressure), friction (e.g., shear stress between conduit wall and fluid), and acceleration (e.g., change in fluid velocity). As an example, one or more equations may be expressed in terms of static reservoir pressure, a flowing bottomhole pressure, wellhead pressure, and flowrates for different phases of produced fluids at the surface during the flowback operations. As an example, equations may account for vertical, horizontal or angled arrangements of equipment. In another example, the flowback model may implement equations that include dynamic conservation equations for momentum, mass and energy. As an example, pressure and momentum can be solved implicitly and simultaneously and, for example, conservation of mass and energy (e.g., temperature) may be solved in succeeding separate stages. Various examples of equations may be found in a dynamic multiphase flow simulator such as the simulator of the OLGA™ simulation framework (Schlumberger Limited, Houston, Tex.), which may be implemented for design and diagnostic analysis of the flowback operations for hydraulically fractured tight reservoirs. OLGA, being a transient multi-phase wellbore flow simulator, can be used to calculate the bottomhole pressure at one or more bottomhole locations inside of the well. To do this, OLGA uses the three-fluid mathematical model that is originally developed and validated for the horizontal flow configurations. The mathematical model in OLGA simulator is summarized in K. Bendiksen et al, "The dynamic two-fluid model OLGA: theory and application," SPE Prod. Eng., 1991, pp. 171-180, herein incorporated by reference in its entirety. Typically, to calculate the bottomhole pressure, the boundary and initial conditions are specified before the simulation. The initial conditions include the distribution of phase volume fractions, velocities, pressure and other variables inside of the well. The boundary conditions typically include the wellhead pressure specified at the outlet of the well and no-flow boundary condition at the bottom of the well. The wellhead pressure can change over in time (transient) and hence specified as a series of time steps. Once these conditions are specified, the simulation is launched. In course of the simulation, the system of conservation equations is solved at each time step to derive the distribution of volume fractions, velocities, pressure (and other variables) in the well, including the bottomhole pressure at one or more bottomhole locations in the well.

Figure 11A:
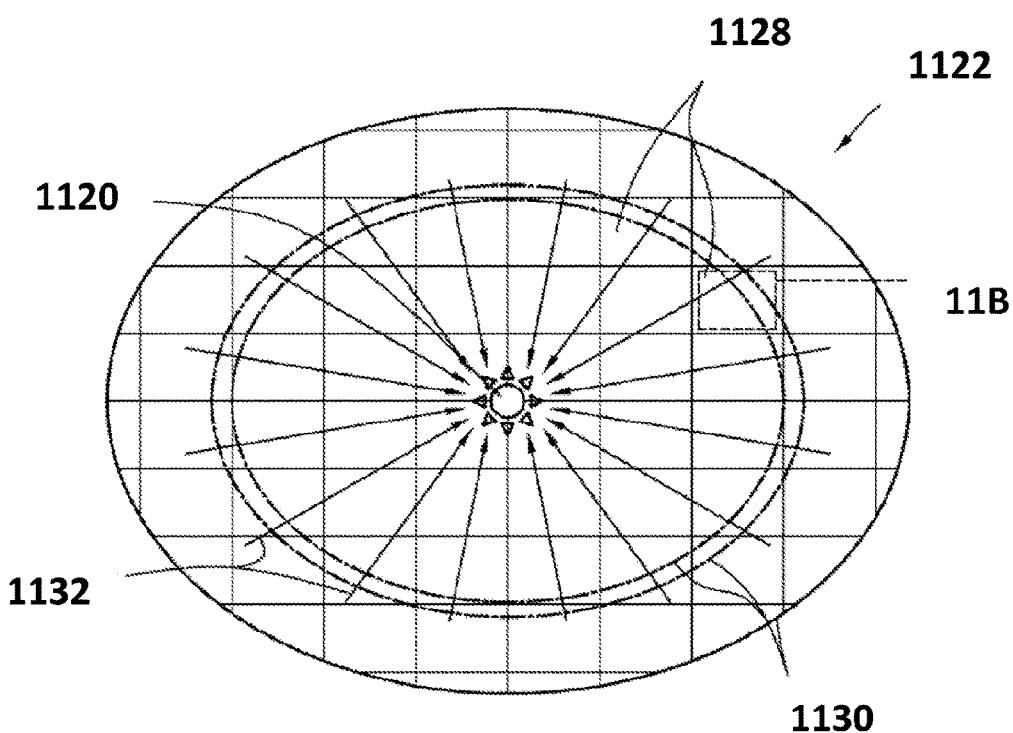
FIG. 11A is a schematic illustration of fluid flow through a dual porosity medium.

FIGS. 11A to 11E illustrate features of an exemplary fracture flow model that can be configured to characterize the flowback fluid flow through the fractures of a reservoir. FIG. 11A shows a two dimensional profile through a hydraulically fractured reservoir around a circular wellbore 1120. As shown in this view, a hydraulic fracture network (HFN) 1122 is depicted as having a plurality of concentric ellipses 1130 and a plurality of radial flow lines 1132. The radial flow lines 1132 initiate from a central location about the wellbore 1120 and extend radially therefrom. The radial flow lines 1132 represent a flow path of fluid from the formation surrounding the wellbore 1120 and to the wellbore 1120 as indicated by the arrows. The HFN 1122 may also be represented in the format as shown in FIG. 11A.

Due to an assumed contrast between the permeability of the matrix and that of the HFN 1122, global gas flow through the reservoir consisting of both the HFN 1122 and the formation matrix can be separated into the gas flow through the HFN 1122 and that inside of the matrix blocks 1128. The pattern of gas flow through the HFN 1122 may be described approximately as elliptical as shown in FIG. 11A.

The HFN 1122 uses an elliptical configuration to provide a coupling between the matrix and HFN flows that is treated explicitly. A partial differential equation is used to describe fluid flow inside a matrix block that is solved analytically. Three-dimensional gas flow through an elliptic wire mesh HFN can be approximately described by:

$$\frac{\partial p_f}{\partial t} - \frac{1}{x}\frac{\partial}{\partial x}\left(x\kappa_f \frac{\partial p_f}{\partial x}\right) = \frac{q_g}{\phi_f \frac{\partial p_f}{\partial p}}, \tag{1}$$

where t is time, x is the coordinate aligned with the major axis of the ellipse, $p_f$ and $\rho_f$ are fluid pressure and density of fluid, $\varphi_f$ and $\kappa_f$ are the porosity and the x-component of the pressure diffusivity of the HFN, and $q_g$ is the rate of gas flow from the matrix into the HFN. All involved properties may be a function of either t or x or both.

For each time t, calculations of fluid pressure using equation (1) may begin from the outmost ring of the elliptical reservoir domain and end at the center of the HFN 1122 at wellbore 1120, or in the reverse order. Fluid pressure along the elliptical domain's boundary is taken as that of the reservoir before production. It may be assumed that no production takes place outside of the domain.

Outside of the HFN, equation (1) still applies nominally, but with $q_g=0$, $\varphi_f=\varphi_m$ and $\kappa_f=\kappa_m$, where $\varphi_m$ and $\kappa_m$ are the porosity and the pressure diffusivity of the reservoir matrix. Given $q_g$ there are various ways available to solve equation (1), either analytically or numerically. Due to the complex nature of the HFN and fluid properties, numerical approaches may be used for the sake of accuracy. An example of numerical solution is given below.

Dividing the elliptic reservoir domain containing the HFN into N rings, the rate of gas production from a reservoir matrix into the HFN contained by the inner and outer boundaries of the k-th ring is $$q_{gk}=q_{gxk}A_{xk}+q_{gyk}A_{yk} \tag{2}$$

where $A_{xk}$ and $A_{yk}$ are the total surface area of the fractures inside of the ring, parallel to the major axis (the x-axis) and the minor axis (they-axis), respectively, and $q_{gxk}$ and $q_{gyk}$ are the corresponding rates of fluid flow per unit fracture surface area from the matrix into the fractures parallel to the x- and y-axis, respectively. Fluid pressure $p_f$ and the rate of gas production into the well can be obtained by numerically (either finite difference, finite volume or a similar method) solving equation (1) for any user specified initial and boundary conditions and by coupling the model with a well model.

Figure 11B:
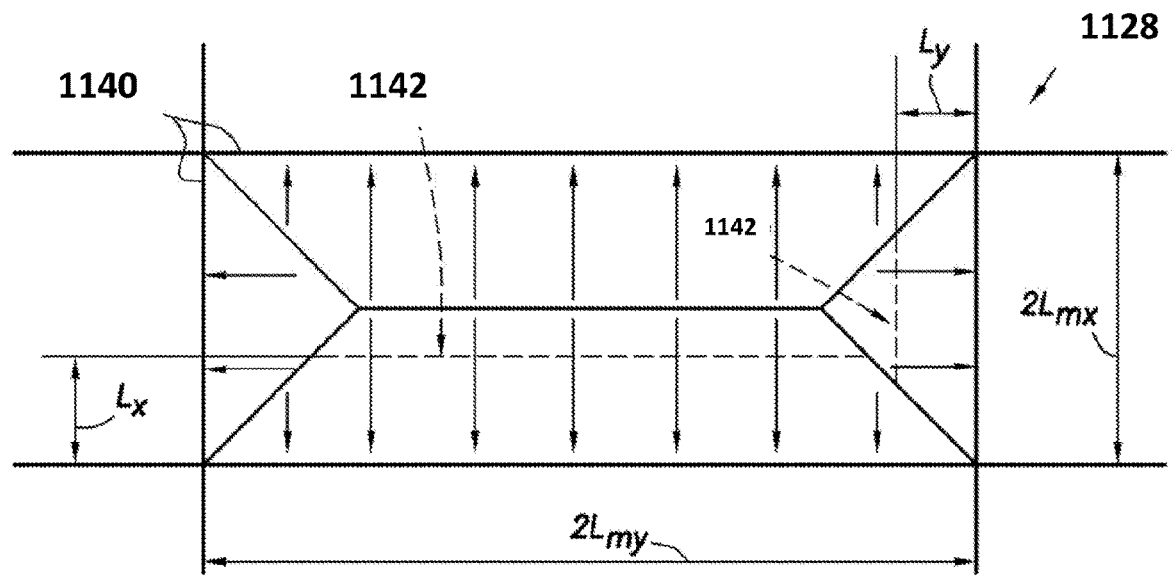
FIG. 11B is a schematic illustration showing fluid flow through in a matrix block shown in FIG. 11A.

Total surface area of fractures contained inside of the k-th ring can be calculated by $$A_{xk} = 4h_k \left[ \sum_{j=-N_{xo}}^{N_{xo}} \sqrt{x_k^2 - 4(jL_{my}/\gamma)^2} - \sum_{j=-N_{xi}}^{N_{xi}} \sqrt{x_{k-1}^2 - 4(jL_{my}/\gamma)^2} \right] \quad (3)$$

$$A_{yk} = 4h_k \gamma \left[ \sum_{i=-N_{yo}}^{N_{yo}} \sqrt{x_k^2 - 4(iL_{mx})^2} - \sum_{i=-N_{yi}}^{N_{yi}} \sqrt{x_{k-1}^2 - 4(iL_{mx})^2} \right],$$

where $\gamma$ is the aspect ratio of the elliptical HFN, $x_k$ and $h_k$ are the location and the height of the k-th ring, $L_{mx}$ and $L_{my}$ are the distances between neighboring fractures parallel to the x-axis and the y-axis, respectively, as shown in FIG. 11B. The $N_{xo}$ and $N_{xi}$ are the number of fractures parallel to and at either side of the x-axis inside the outer and the inner boundaries, respectively, of the k-th ring, and $N_{yo}$ and $N_{yi}$ are the number of fractures parallel to and at either side of the y-axis inside the outer and the inner boundaries, respectively, of the k-th ring.

The pattern of gas flow through the HFN 1122 may also be described based on fluid flow through individual matrix blocks 1128 as shown in FIG. 11B. FIG. 11B is a detailed view of one of the blocks 1128 of HFN 1122 of FIG. 11A. As shown in this view, the direction of gas flow inside of a matrix block 1128 can be approximated as perpendicular to the edges of the matrix block 1128. Fluid flow is assumed to be linear flow toward outer boundaries 1140 of the block 1128 as indicated by the arrows, with no flow boundaries 1142 positioned within the block 1128.

Fluid flow inside a rectangular matrix block 1128 can be approximately described by $$\frac{\partial p_m}{\partial t} - \kappa_m \frac{\partial^2 p_m}{\partial s^2} = 0 \quad (4)$$

$$p_m(t, s) = p_r$$

$$p_m(t, L_s) = p_f(t)$$

$$\left. \frac{\partial p_m}{\partial t} \right|_{s=0} = 0,$$

where s is the coordinate, aligned with the x-axis or y-axis, L is the distance between the fracture surface and the effective no-flow boundary, $p_m$ is fluid pressure and $p_r$ is the reservoir pressure. Equation (4) can be solved to obtain the rate of fluid flow from the matrix into the fractures inside the k-th ring $$q_{gxk} = \varphi_m \frac{\partial \rho_m}{\partial p} \frac{\partial}{\partial t} \int_0^t \frac{\partial p_{fk}}{\partial u} \quad (5)$$

$$\left[ \frac{L_y}{2} \text{erfc}\left( \frac{L_y}{4\sqrt{\kappa_m(t-u)}} \right) + 2\sqrt{\frac{\kappa_m(t-u)}{\pi}} \left( 1 - e^{\frac{L_y^2}{16\kappa_m(t-u)}} \right) \right] du$$

$$q_{gyk} = \varphi_m \frac{\partial \rho_m}{\partial p} \frac{\partial}{\partial t} \int_0^t \frac{\partial p_{fk}}{\partial u}$$

$$\left[ \frac{L_x}{2} \text{erfc}\left( \frac{L_x}{4\sqrt{\kappa_m(t-u)}} \right) + 2\sqrt{\frac{\kappa_m(t-u)}{\pi}} \left( 1 - e^{\frac{L_x^2}{16\kappa_m(t-u)}} \right) \right] du,$$

where $p_{fk}$ is the pressure of the fluid residing in fractures in the k-th ring and $\rho_m$ is the density of the fluid residing in the matrix. The coupling of $p_{fk}$ and $q_{gk}$ calculations can be either explicit or implicit. It may be implicit for the first time step even if the rest of the time is explicit.

Figure 11C:
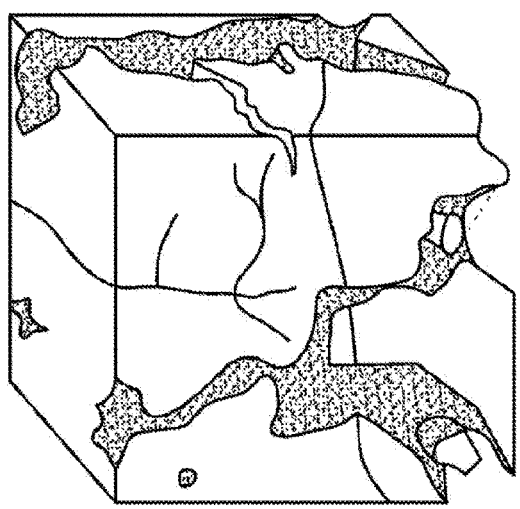
FIGS. 11C and 11D are schematic diagrams for depicting fluid flow through a medium.
Figure 11D:
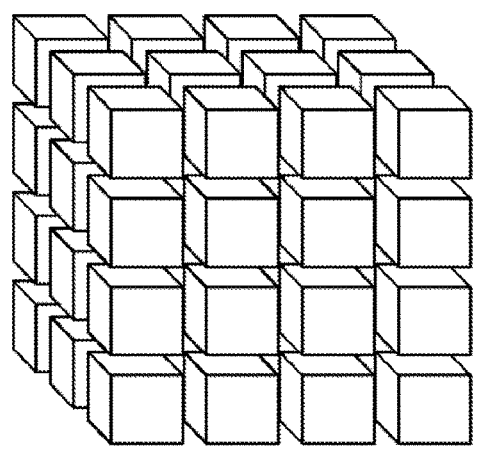

Conventional techniques may also be used to describe the concept of fluid flow through a dual porosity medium. Some such techniques may involve a one-dimensional pressure solution with constant fracture fluid pressure, and depict an actual reservoir by identifying the matrix, fracture, and vugs therein as shown in FIG. 11C, or depicting the reservoir using a sugar cube representation as shown in FIG. 11D. Examples of conventional fluid flow techniques are described in Warren et al., "The Behavior of Naturally Fractured Reservoirs", SPE Journal, Vol. 3, No. 3, September 1963.

Examples of fracture modeling that may be used in the modeling described herein are provided in Wenyue Xu et al., "Quick Estimate of Initial Production from Stimulated Reservoirs with Complex Hydraulic Fracture Network," SPE 146753, SPE Annual Tech. Conf. and Exhibition, Denver, Colo., 30 Oct.-2 Nov. 2011, the entire content of which is hereby incorporated by reference.

Figure 11E:
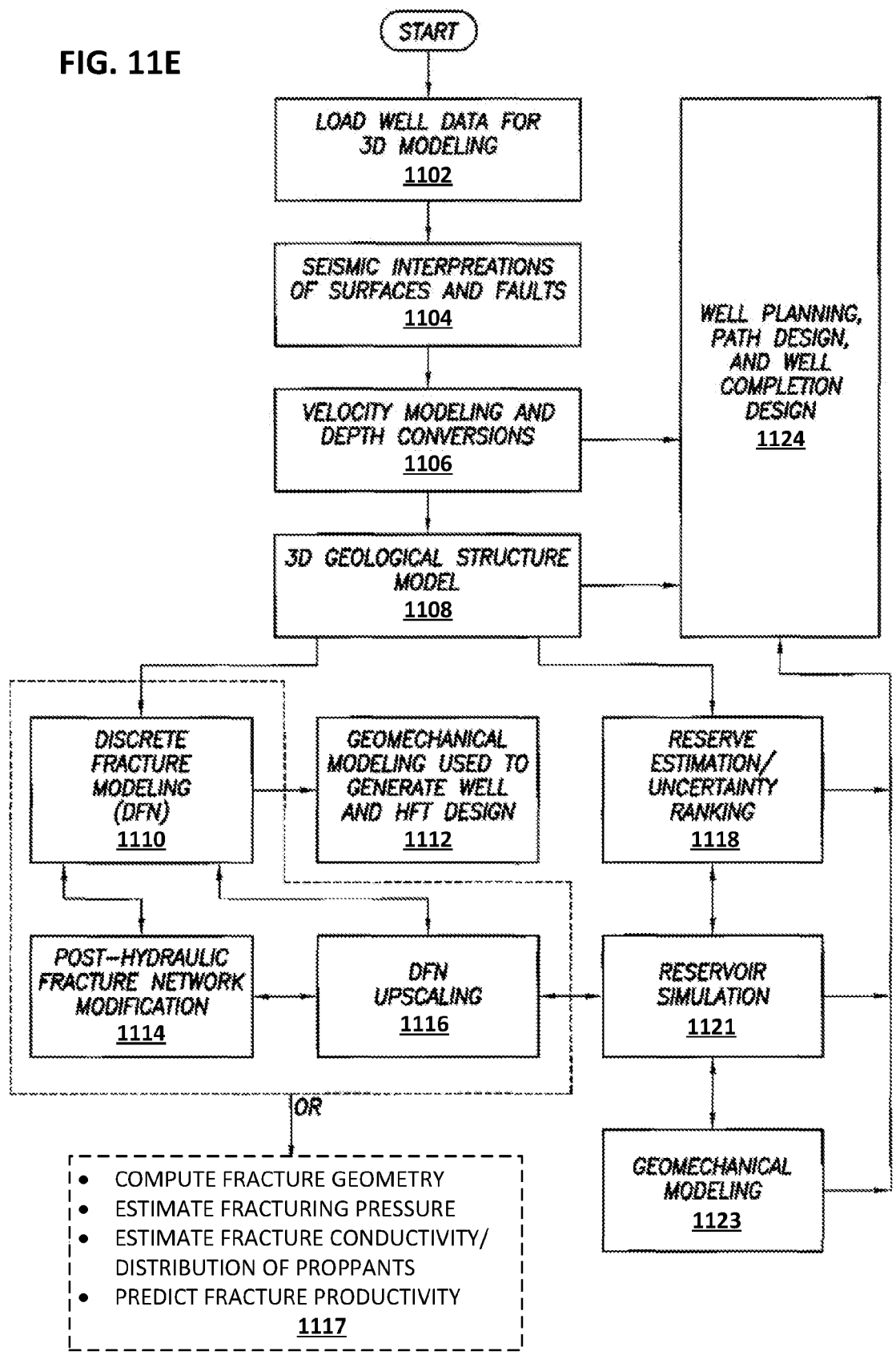
FIG. 11E depicts an example flow chart of a method for fracture modeling.

FIG. 11E shows a flow chart depicting a method for fracture modeling. In one or more embodiments, one or more of the steps shown in FIG. 11E may be omitted, repeated, and/or performed in a different order than the order shown in FIG. 11E. Accordingly, the scope of modeling hydraulic fracturing induced fracture networks as a dual porosity system should not be considered limited to the specific arrangement of steps shown in FIG. 11E.

In element 1102, well data may be loaded for three-dimensional modeling. For example, the data listed below in Table 1 may be obtained for three-dimensional modeling.

TABLE 1

| Category | Data Item |
|---|---|
| Well head | Location (x, y), Kelly bushing, total depth |
| Well path | Deviation survey |
| Well logs | Conventional log and interpretations (gamma, resistivity, porosity, Sw, density, neutron, caliper etc.), Logging While Drilling (LWD) Lithology (ELAN interpretations), Mineralogy (ECS) and Toc, Sw, Perm, porosity, AdsGas, freeGas etc. (Shale Gas Advisor) Lithofacies (Cluster - reservoir quality indicator) Rock mechanical property and stress (DSI dipole shear sonic imaging/Sonic Scanner/MDT (modular formation dynamics tester) packer module) Borehole image (FMI, formation micro images) and interpretations; fracture categories, corrections and analyses |
| Core data | Lab test of petrophysical (k, phi, sw etc.), and geomechanical (UCI (ultrasonic casing imager), elastic properties, including anisotropy) for possible log calibration |
| Isothermal | Shale rock adsorption/desorption test data; gas content (Langmuir pressure and volume constants); single and multi-component data |
| Well tops | Marker well name, depth, dip and azimuth if any |
| Structure | Surface, faults interpretation if any |
| Seismic | Original volume, and various derived attributes, and loading parameters |
| Velocity | Sonic log and check shots or velocity models or parameters |
| Fracturing Job | Stages, gases, liquid and proppants volumes, schedules, properties of injected materials |
| Micro Seismic | Variety of attributes, pumping records, rate, pressure, ISIP (instantaneous shut in pressure) data |
| Production | Production surveys, tracer test, well testing, and production dynamic data |
| Completion | Wellbore data, perforation, length |
| Fluid & Rock | Gas composition, water and oil, and other PVT (pressure-volume-temperature) properties; saturation functions |
| Reports | Any previous studies and reports |

In element 1104, surface and fault interpretations may be performed in the time domain. Specifically, surface seismic interpretation can be accelerated with autotracking, and fault interpretation can be expedited through ant-tracking using simulation software. With the majority of the well data in the depth domain, seismic results may also be depth-converted and integrated. Often, check shots, sonic logs, and velocity data are available to build the velocity model. In one or more embodiments, interval velocities produced for each stratigraphic unit (zone) are satisfactory for modeling reservoirs.

In element 1106, depth conversion may be performed to convert time domain seismic information such as original seismic data volumes or any other special seismic attributes, interpreted surfaces, and faults. Depth surfaces and/or well tops may be used to build model horizons.

At this stage, the horizons and well controls, together with proper fault modeling, segment definition, and boundary conditions are used to create a three-dimensional structure model (element 1108). The three-dimensional model provides a framework for further geomechanical zone modification, log upscaling, seismic attributes resampling, data analysis, correlation development, fracture simulation driver development, discrete fracture modeling, and reservoir simulation gridding.

In element 1110, a discrete fracture network (DFN) may be generated. Specifically, edge enhancement may be performed to identify faults, fractures, and other linear anomalies using seismic data. In this case, the seismic data may be conditioned by reducing noise in the signal, spatial discontinuities in the seismic data (edge detection) are then enhanced, and finally a seismic three-dimensional volume including automated structural interpretations is generated, which significantly improves the fault attributes by suppressing noise and remnants of non-faulting events. Fault patches or planes of discontinuity can then be extracted from the three-dimensional seismic volume. The patches of faults or fractures are analyzed and edited, and fracture/fault patches can be directly converted as a deterministic DFN.

In shale gas reservoir applications, the three-dimensional seismic volume is used to identify significant fault and karst features. The karst features may be extracted and modeled as faults in conjunction with production, tracer testing, and well testing analysis to reveal the large-scale reservoir connectivity. A general observation in terms of reservoir connectivity is that wells several miles apart may have pressure communications. The pressure communications may be considered by manually adding fractures in the fracture model.

Although open natural fractures may not be identified from core samples, borehole images such as formation micro-images (FMI), OBM (oil based mud) images, UBI (ultrasonic borehole imager) images, and LWD (Logging While Drilling) images may be used to interpret natural fractures (e.g., open, partially opened or healed fractures) and drilling induced fractures, which are subject to easier opening by hydraulic fracturing than virgin shale rock. In view of this, all types of interpreted fractures may be considered as constituting a "natural" or "pre-existing" fracture network that partially controls hydraulic fracture network intensity and distribution. Thus, one use of the "natural" network information is to assist the design of well path and hydraulic fracturing.

FMI interpreted fractures (and intensity logs) may also be classified, analyzed, and correlated with rock properties, geomechanical zones, and other seismic drivers. Further, various seismic attributes may be resampled into the three-dimensional model. With flexible functionalities in the three-dimensional model space, different fracture intensity drivers may be evaluated. The fracture intensity drivers include, but are not limited to, distance to faults, lithological properties, discontinuous properties, or neural network train-estimation derived properties (care should be taken to identify correlated drivers). With proper property drivers, fracture intensity three-dimensional distributions may be achieved, mostly with stochastic simulations or possible deterministic methods. Those skilled in the art will appreciate that different types or sets of fracture intensity properties can be simulated separately with different drivers to reflect specific natural characteristics. With known well control fracture dips and azimuths input as constants, two-dimensional or three-dimensional properties, and specific fracture geometry specifications, three-dimensional discrete fracture network (DFN) can be generated.

In element 1114, microseismic (MS) mapping and post-hydraulic fracturing (PHF) network modeling may be performed. For example, based on the available field data, a proximal solution may be provided. As discussed above, MS monitoring has been used in the shale gas reservoir to monitor fracture propagation and the hydraulic job process, and to control fracture propagation through pressure/rate change and techniques such as fiber-assisted or particle-assisted diversion. The significant features of aerially similar MS events distribution indicates that the shale gas reservoir PHF system is a fracture network, and therefore various operational techniques may be used to create additional aerial coverage and an intensified PHF network.

In one or more embodiments, an MS event envelope is used to estimate a three-dimensional hydraulic fracturing stimulated reservoir volume (ESV) and then hydraulic fracturing job parameters are applied to estimate dynamic and propped fracture conductivity (possible permeability and width estimation). To estimate the PHF network, the MS event envelope may be extracted from the three-dimensional model. In simple cases, a two-dimensional mapview can be used to obtain the outside boundary. Vertically, the fractures growing into a non-reservoir formation may be considered for volume correction when calculating fluid and proppant conservations. With certain fracture propagation model assumptions, fluid and proppant mass conservation and fracture width distribution and fracture network intensity can be estimated and corresponding propped fracture width can be calculated. By applying laboratory results, fracture conductivity (FCD) may be estimated. "Natural" fracture DFN within an MS event envelope may be assumed to be opened and propped for evaluation in a base case reservoir simulation.

In element 1116, fracture attributes and discrete fracture network (DFN) upscaling may be performed. For example, fracture attributes may be associated with a DFN. During DFN modeling as discussed above with respect to element 1110, geometry parameters may be assigned to each fracture such as: surface area, dip angle, and dip azimuth. Other examples of attributes that may be assigned or calculated are aperture and permeability. The aperture data may be related to the calculations of porosity permeability. For both "natural" fracture networks and PHF networks with proper aperture and permeability, respectively, upscaling may be performed. The "natural" fracture network may serve as a background reservoir, and the PHF network, as modified with the MS and fracture job data, may serve as a stimulated reservoir volume with enhanced reservoir properties.

In one or more embodiments, the discrete fracture system may be upscaled to a dual porosity/permeability reservoir model and then use simulator(s) to model the reservoir dynamics. Examples of properties generated by the upscaling process include fracture porosity, fracture permeability, Sigma (shape) factor defining the connectivity between fractures and matrix, and fracture spacing along local directions (I, J, K) for each grid cell. Those skilled in the art will appreciate that the dual porosity modeling approach may not be suitable for all cases. A proper simulation should be based on a proper understanding of the DFN and PHF fracture systems and corresponding shale production mechanism.

Elements 1110, 1114 and 1116 may be combined or replaced with an alternative methodology as shown in element 1117. More specifically, in element 1117 fracture geometry is computed, fracturing pressure is estimated, fracture conductivity and distribution of proppants are estimated, and fracture productivity is determined.

In element 1112, the structure from element 1108 and the DFN from element 1110 may be used to perform geomechanical modeling, where the results are used for generating a well path and hydraulic fracturing treatment (HFT) design with stress constraints and fault/karst avoidance. Specifically, the DFN including the FMI interpreted fractures may be used to generate the HFT design, where the natural tendency of the formation to fracture may be taken into account in order to optimize the hydraulic fracturing. In other words, based on the fracture orientations, network distribution and intensity of the natural fracture determined in element 1110, proper well orientation and fracturing stage and perforation cluster designs may be generated to maximize fracture intensity and control PHF network distribution. Further, the results are also fed into element 1121, as expressed below as the geomechanical modeling repeated in element 1123.

Some geomechanical and petrophysical properties may be obtained at well location for example through core analysis and log interpretation. Further, varieties of seismic attributes reflect lithofacies and mechanical and petrophysical formation characteristics. A geostatistical approach may be used to model the properties in a three-dimensional distribution using well data as the primary data source and the seismic as secondary constraints. For example, lithofacies representations may correspond to a cluster result derived from a suite of basic logs (gamma, resistivity, density). The clusters (or lithofacies) data is used to classify mechanical and petrophysical properties. Within each cluster, constant values may be assigned, or conduct stochastic simulations may be performed.

The properties modeled using well logs and seismic include, but are not limited to, cluster facies, porosity, water saturation, permeability, total organic carbon (TOC), shale gas content and Young's modulus, Poisson's ratio, etc. In one or more embodiments, Sonic Scanner/DSI (dipole sonic image) derived parameters may be direction simulated and used to obtain final properties.

In element 1118, the petrophysical properties such as effective porosity, water saturation, and gas content from the three-dimensional geological structure model generated in element 1108 may be used to estimate gas-in-place (GIP). In this case, the petrophysical properties may also be processed using an uncertainty workflow to rank the risks of various aspects of the wellbore.

In element 1121, a reservoir simulation may be performed.

The dual porosity reservoir properties (fracture permeability, etc.) upscaled from the DFN in element 1116 and petrophysical matrix properties (e.g., phie, Sw, etc.) by stochastic simulation may be utilized by the reservoir simulator. With a known well completion configuration and production control, production history matching may be pursued to confirm or modify the reservoir model, especially the fracture network geometry, fracture connectivity, and permeability. Further, experimental design methodology may be used to perform sensitivity analysis, assist the history-matching process, and improve the reservoir characterization. In addition, a full, automated, history-matching process may be used to link geological model variation and the reservoir simulation in an iterative process. If permeability change versus reservoir pressure is known, the impact of permeability decrease with production of flowback fluid may be considered.

In element 1123, geomechanical modeling and stress analysis may be performed. Specifically, FMI interpreted drilling-induced fractures and possible wellbore breakouts may be used to determine stress direction and distribution. Sonic Scanner and DSI (dipole sonic image) data may also be used to estimate mechanical properties of rock formations and stresses. Wire line formation tester (e.g., modular formation dynamics tester or some other tester) tests and interpretation may be used to calibrate in-situ stress data (pore pressure and minimum stress). Further, some seismic attributes may be extracted to guide a three-dimensional stress field distribution. Using reservoir simulation software, a mechanical earth model (MEM) with rock mechanical properties, faults, fractures, overburden, underburden, side burden, complex geological structures, and pore pressure and stress/strain boundary conditions may be generated and used for pore pressure prediction, geomechanical modeling, and wellbore stability analysis. Geomechanical modeling packages (such as a stress analysis simulator) could simulate in-situ stress distribution, stress-sensitive permeability and porosity changes, and study hydraulic fracture propagation mechanism. Coupling geomechanical modeling (stress analysis simulation) with reservoir simulation may optimize reservoir development strategies, wellbore stability analysis, optimum mud weight design, formation subsidence, and casing damage analyses with reservoir depletion.

In element 1124, well spacing, hydraulic fracturing design, and/or production optimization may be performed. In the case of production optimization, control parameters of the hydraulic fracturing process may be modified based on the reservoir simulation of element 1123 (i.e., where to create the fracture network, how intensified the network needs to be, and how to implement through operations). Further, based on reservoir characterization as proposed above, the following steps may be performed: 1) using the geological modeling result, particularly the DFN network information, geomechanical heterogeneity and stress field, to conduct a geomechanical modeling study to provide qualitative guidance for a well path, well completion, fracture stages and cluster designs; 2) establishing a relationship among reservoir characteristics, job processes, various scenarios (e.g., well lengths, fracture stages, liquid and proppant volumes, etc.), and reservoir production behavior; 3) performing reservoir simulation sensitivity analysis (ensuring that the proper application of the dual porosity model is applied in simulation); 4) extracting guidelines for future design practices and operations.

Those skilled in the art will appreciate that portions of FIG. 11E may be applied in various field development stages. For example, elements of FIG. 11E may be performed to construct structural models and three-dimensional visualizations of a structural surface superimposed with seismic attributes to monitor live fracturing jobs and respond with operation modifications such as fiber diversion (e.g., a stage of slurry containing degradable fibers is used to create a temporary bridge within the fracture, and make a pressure increase and force fracture propagation into another zone or a different area of the same formation). In another example, elements of FIG. 11E may be performed to distribute three-dimensional clusters in reservoirs (clusters denoting reservoir quality). Further, geostatistical property modeling may be used to upscale facies log and simulate with seismic attributes and neural network trained-estimation properties. In this case, the significant features of facies continuity may be confirmed with an additional cluster log, where the simulated three-dimensional result is used to guide well path design, targeting the best quality of the reservoir.

In yet another example, elements of FIG. 11E may be performed to distribute the DFN in a three-dimensional reservoir and analyze the relationship between MS events response and "natural" fracture orientations. In this example, the total set of fractures may be divided into four subsets: N_S:N, N_S:S, E_W:E, and E_W:W. Drilling-induced fractures may be aligned with one subset (e.g., E-W) of natural fractures (thus the minimum stress direction is perpendicular to fracture strike in the E-W set). Following the workflow, the DFN network may be simulated, and MS events may be displayed over the DFN network. The MS events may be controlled by the minimum stress direction and the existing "natural" fractures. Specifically, MS events may align with the subsets of E_W:W and E_W:E, where the N_S sets help create the wide band nature of the MS events.

Control System—Choke Control

Figure 12:
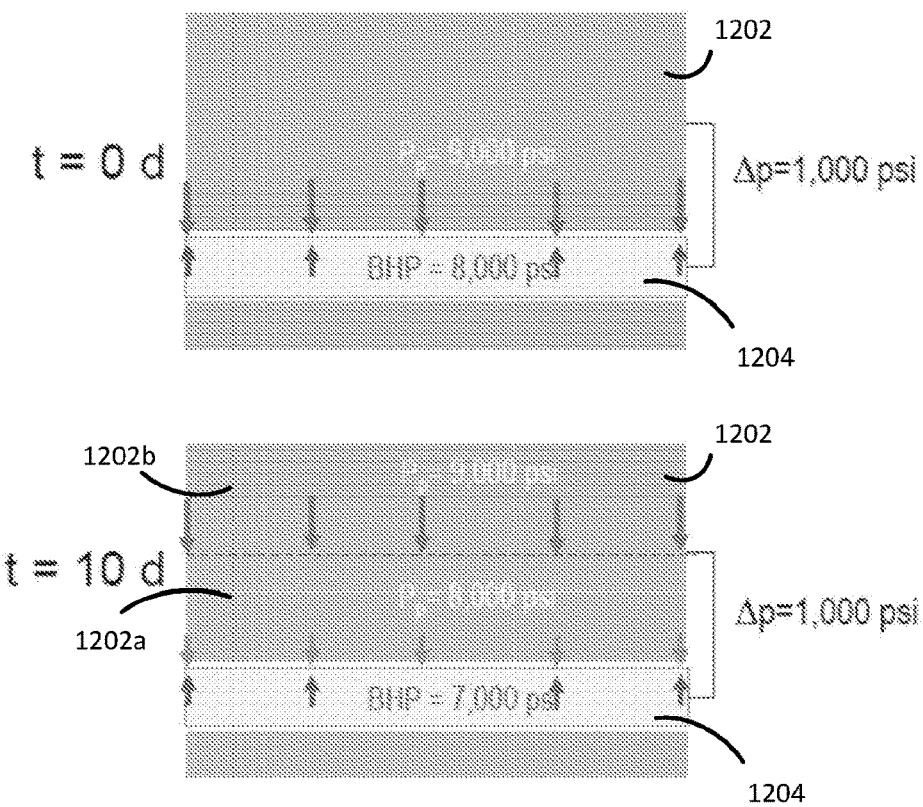
FIG. 12 is a schematic illustration of drawdown pressures at a respective bottomhole position in a well at two different times during an exemplary flowback operation.

As described above, the drawdown pressure can be calculated from the determined pressure distributions output by the flowback model 514 (FIGS. 3 and 4). For example, FIG. 12 illustrates schematically localized bottomhole and reservoir pressures at a downstream end of a production liner 1204 in a hydraulically fractured reservoir 1202. When the choke 508 (FIGS. 3 and 4) is partially open and fluids begin to move from the reservoir 1202 into the liner 1204, the drawdown pressure will change over time. In the example shown in FIG. 12, initially at time t=0, the reservoir pressure is 9,000 psi (radially uniform distribution) and the initial bottomhole pressure is 8,000 psi, resulting in an initial drawdown pressure of 1,000 psi at time t=0. Also, in the example shown in FIG. 12, at time t=10 days, after at least some fluid has moved from the reservoir and into the liner 1204, there is a non-uniform radial reservoir pressure distribution in which the pressure at a first, radially proximate region 1202a is 8,000 psi, at a second, radially distal region 1202b is 9,000 psi, and the bottomhole pressure is 7,000 psi. Thus, after 10 days, the average reservoir pressure is 8,500 psi, such that the drawdown pressure is 1,500 psi. Thus, in the example in FIG. 12 the drawdown pressure increased 500 psi in the span of 10 days.

The calculated drawdown pressure in the example of FIG. 12 may be continuously calculated and compared against a schedule of maximum/minimum allowable drawdown pressures over time as determined from a predetermined functional relationship, such as the curves shown in FIG. 13. Such a schedule of drawdown pressures may be used by the automatic choke control 512 for determining the recommended choke setting in block 540, as discussed above. FIG. 13 illustrates a safe zone 1302 in which to conduct the flowback operations. The safe zone 1302 is bounded by two drawdown curves: an upper curve 1304 for an upper limit of maximum allowable drawdown pressure; and a lower curve 1306 for a lower limit of maximum allowable drawdown pressure. The curves 1304 and 1306 in FIG. 13 may be obtained experimentally from sampling rock of the reservoir, such as reservoir 1202 in the example of FIG. 12. For example, strength and permeability testing—ideally as a function of completion fluid type—may be done on each section of the reservoir that is expected to be contacted by the hydraulic fracture network (HFN) to determine the variability in rock strength. The initial flowback strategy may be tailored to the weakest section of the reservoir that would have an impact on production. Without these values it would not be possible to determine the initial drawdown limits in FIG. 13, nor how they vary with time.

Turning back to FIG. 4, at block 540 a comparison between the calculated drawdown pressure and the maximum allowable drawdown pressures on curves 1304 and 1306 may be used to make recommendations for adjustment of the choke 508. For example, if the calculated drawdown pressure is outside of the safe zone 1302 in FIG. 13, then adjustments to the choke 508 may be recommended to increase or decrease the bottomhole pressure. Specifically, if the calculated drawdown pressure at a respective time is above the safe zone 1302 (i.e., in the failure zone) in FIG. 13, then a recommendation may be generated at block 540 to adjust the choke 508 to partially or fully close, to thereby limit damage to the reservoir. If the determined drawdown pressure at a respective time is below the safe zone 1302, then a recommendation may be generated at block 540 to adjust the choke 508 to partially or fully open to increase the flow rate of flowback fluid to improve efficiency of the flowback operation.

Also, if the calculated drawdown pressure is within the safe zone 1302 of FIG. 13, recommendations may be made to adjust the choke 508 while still operating in the safe zone 1302. For example, if the calculated drawdown pressure is within the safe zone 1302, there may be an opportunity to increase the flow rate of flowback fluid while still operating in the safe zone 1302. For example, if the target flow rate of oil is higher than the measured flow rate and the calculated drawdown pressure is within the safe zone 1302, then a recommendation can be made to adjust the choke 508 to open more to increase the flow of oil in the flowback fluid, while monitoring that the drawdown pressure does not exceed that of the upper curve 1304 in FIG. 13.

Slug Formation

Figure 15:
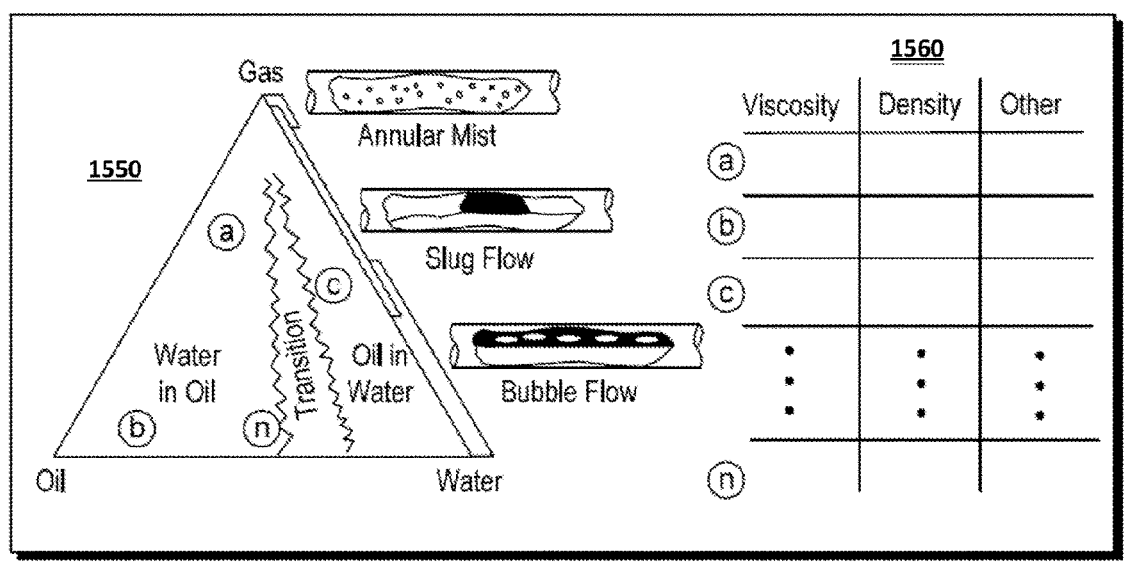
FIG. 15 illustrates an example of a ternary diagram with an example of an associated table of fluid properties.

FIG. 15 illustrates a ternary diagram 1550 that includes vertices that represent single-phase gas, oil and water, while the sides represent two phase mixtures (e.g., gas-oil, oil-water and gas-water) and points within the triangle represents a three-phase mixture. A transition region indicates where the liquid fraction changes from water-in-oil to oil-in-water and vice versa (e.g., consider emulsions).

The ternary diagram 1550 also indicates some examples of ranges of multiphase flow regimes, which may be affected by one or more factors such as, for example, temperature, pressure, viscosity, density, flow line orientation, etc. The example flow regimes include annular mist, slug flow, and bubble flow; noting that other types of may occur (e.g., stratified, churn, disperse, etc.). Annular mist flow may be characterized by, for example, a layer of liquid on the wall of a pipe and droplets of liquid in a middle gas zone (e.g., mist). Slug flow may be characterized by, for example, a continuous liquid phase and a discontinuous liquid phase that is discontinuous due to separation by pockets of gas. Bubble flow may be characterized by, for example, two continuous liquid phases where at least one of the continuous liquid phases includes gas bubbles. The illustrative graphics of flow regimes in FIG. 15 correspond to flows in approximately horizontal conduits (e.g., production liner 210 of FIG. 1); noting that a conduit may be disposed at an angle other than horizontal and that various factors that can influence flow may depend on angle of a conduit. For example, the angle of a conduit with respect to gravity can have an influence on how fluid flows in the conduit. In vertical flow (i.e., in production tubing 206 in FIG. 1), the slug is an axially symmetrical bullet shape that occupies almost the entire cross-sectional area of the tubing.

The table 1560 of FIG. 15 shows viscosity and density as fluid properties. As to one or more other properties, consider, for example, surface tension. As indicated, the table 1560 can include information for points specified with respect to the ternary diagram 1550. As an example, factors such as pressure, volume and temperature may be considered, for example, as to values of fluid properties, phases, flow regimes, etc.

As an example, information as to flow of fluid may be illustrated as a flow regime map that identifies flow patterns occurring in various parts of a parameter space defined by component flow rates. For example, consider flow rates such as volume fluxes, mass fluxes, momentum fluxes, or one or more other quantities. Boundaries between various flow patterns in a flow regime map may occur where a regime becomes unstable and where growth of such instability causes transition to another flow pattern. As in laminar-to-turbulent transition in single-phase flow, multiphase transitions may be rather unpredictable as they may depend on otherwise minor features of the flow, such as the roughness of the walls or the entrance conditions. Thus, as indicated in the ternary diagram 1550, flow pattern boundaries may lack distinctiveness and exhibit transition zones.

As to properties, where fluid is single phase (e.g., water, oil or gas), a single value of viscosity may suffice for given conditions. However, where fluid is multiphase, two or more concurrent phases may occupy a flow space within a conduit (e.g., a pipe). In such an example, a single value of viscosity (e.g., or density) may not properly characterize the fluid in that flow space. Accordingly, as an example, a value or values of mixture viscosities may be used, for example, where a mixture value is a function of phase fraction(s) for fluid in a multiphase flow space. As to surface tension (e.g., σ), it may be defined for gas and/or liquid, for example, where the liquid may be oil or water. Where two-phase liquid-liquid flow exists (e.g., water and oil), then a may reflect the interfacial tension between oil and water (see, e.g., the slug flow regime and the bubble flow regime).

Multiphase flow, including slug flow, may be modeled and simulated. Multi-dimensional simulation presents a challenge, however, as it may require an impractical amount of computing resources and/or time. Thus, at least for long pipelines, one-dimensional models may be employed, in which properties of the flow are averaged over the pipe cross-section. The model then describes how these averaged properties vary along the pipeline and with time.

Such models may implement various strategies for modeling slug flow. For example, in "slug tracking," the boundaries (front and tail) of the slugs are followed as they propagate along the pipe. Thus, the slugs and separated zones are represented on a Lagrangian grid, which is superimposed on the Eulerian grid used to solve the basic equations. In another example, "slug capturing," the underlying equations are resolved on a fine Eulerian grid, including the growth of large waves and the formation of slugs, so that each slug is represented.

These models may provide satisfactory results in a wide variety of contexts. However, some such methods of slug flow modeling and simulation may include long computation times, accuracy and/or stability issues, and/or tuning to match experimental or otherwise measured datasets, such as by using an iterative, trial-and-error process.

Figure 16:
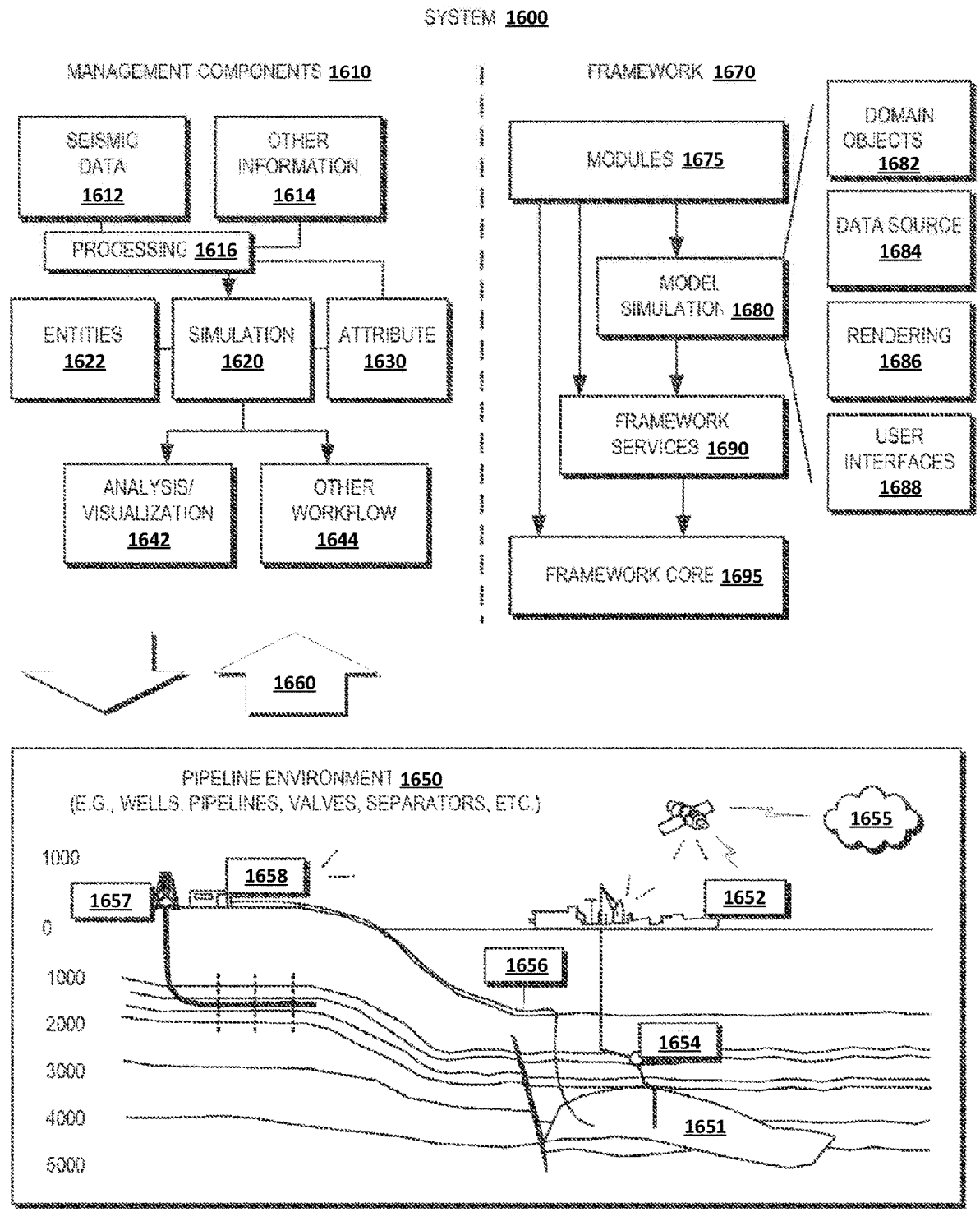
FIG. 16 illustrates an example of a system that includes various management components to manage various aspects of a pipeline environment, according to an embodiment.

FIG. 16 illustrates an example of a system 1600 that includes various management components 1610 to manage various aspects of a pipeline environment 1650 (e.g., an environment that includes wells, transportation lines, risers, chokes, valves, separators, etc.). For example, the management components 1610 may allow for direct or indirect management of design, operations, control, optimization, etc., with respect to the pipeline environment 1650. In turn, further information about the pipeline environment 1650 may become available as feedback 1660 (e.g., optionally as input to one or more of the management components 1610).

In the example of FIG. 16, the management components 1610 include a pipeline configuration component 1612, an additional information component 1614 (e.g., fluid measurement data), a processing component 1616, a simulation component 1620, an attribute component 1630, an analysis/visualization component 1642 and a workflow component 1644. In operation, pipeline configuration data and other information provided per the components 1612 and 1614 may be input to the simulation component 1620.

In an example embodiment, the simulation component 1620 may rely on pipeline components or "entities" 1622. The pipeline components 1622 may include pipe structures and/or equipment. In the system 1600, the components 1622 can include virtual representations of actual physical components that are reconstructed for purposes of simulation. The components 1622 may include components based on data acquired via sensing, observation, etc. (e.g., the pipeline configuration 1612 and other information 1614). An entity may be characterized by one or more properties (e.g., a pipeline model may be characterized by changes in pressure, heat transfer, pipe inclination and geometry, etc.). Such properties may represent one or more measurements (e.g., acquired data), calculations, etc.

In an example embodiment, the simulation component 1620 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use by a program, script, etc. For example, borehole classes may define objects for representing boreholes based on well data.

In the example of FIG. 16, the simulation component 1620 may process information to conform to one or more attributes specified by the attribute component 1630, which may include a library of attributes. Such processing may occur prior to input to the simulation component 1620 (e.g., consider the processing component 1616). As an example, the simulation component 1620 may perform operations on input information based on one or more attributes specified by the attribute component 1630. In an example embodiment, the simulation component 1620 may construct one or more models of the pipeline environment 1650, which may be relied on to simulate behavior of the pipeline environment 1650 (e.g., responsive to one or more acts, whether natural or artificial). In the example of FIG. 16, the analysis/visualization component 1642 may allow for interaction with a model or model-based results (e.g., simulation results, etc.). As an example, output from the simulation component 1620 may be input to one or more other workflows, as indicated by a workflow component 1644.

As an example, the simulation component 1620 may include one or more features of a simulator such as a simulator provided in OLGA® (Schlumberger Limited, Houston Tex. Further, in an example embodiment, the management components 1610 may include features of a commercially available framework such as OLGA® or the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, pipeline engineers, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 210 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into OLGA® or a PETREL® framework workflow. The OCEAN® framework environment leverages NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 16 also shows an example of a framework 1670 that includes a model simulation layer 1680 along with a framework services layer 1690, a framework core layer 1695 and a modules layer 1675. The framework 1670 may include the commercially available OCEAN® framework where the model simulation layer 1680 may be either OLGA® or the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of pipeline configuration, one or more attributes based at least in part on pipeline configuration, log data, image data, etc. Such a framework may include a mesh generation component that processes input information, optionally in conjunction with other information, to generate a mesh.

In the example of FIG. 16, the model simulation layer 1680 may provide domain objects 1682, act as a data source 1684, provide for rendering 1686 and provide for various user interfaces 1688. Rendering 1686 may provide a graphical environment in which applications can display their data while the user interfaces 1688 may provide a common look and feel for application user interface components.

As an example, the domain objects 1682 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 16, data may be stored in one or more data sources (or data stores, generally physical data storage devices), which may be at the same or different physical sites and accessible via one or more networks. The model simulation layer 1680 may be configured to model projects. As such, a particular project may be stored where stored project information may include inputs, models, results and cases. Thus, upon completion of a modeling session, a user may store a project. At a later time, the project can be accessed and restored using the model simulation layer 1680, which can recreate instances of the relevant domain objects.

In the example of FIG. 16, the pipeline environment 1650 may be outfitted with any of a variety of sensors, detectors, actuators, etc. For example, equipment 1652 may include communication circuitry to receive and to transmit information with respect to one or more networks 1655. Such information may include information associated with downhole equipment 1654, which may be equipment to acquire information, to assist with resource recovery, etc. Such equipment may include storage and communication circuitry to store and to communicate data, instructions, etc. As an example, one or more satellites may be provided for purposes of communications, data acquisition, etc. For example, FIG. 16 shows a satellite in communication with the network 1655 that may be configured for communications, noting that the satellite may additionally or alternatively include circuitry for imagery (e.g., spatial, spectral, temporal, radiometric, etc.).

FIG. 16 also shows the geologic environment 1650 as optionally including equipment 1657 and 1658 associated with a well. As an example, the equipment 1657 and/or 1658 may include components, a system, systems, etc. for pipeline condition monitoring, sensing, valve modulation, pump control, analysis of pipeline data, assessment of one or more pipelines 1656, etc. The pipelines 1656 may include at least a portion of the well, and may form part of, or be representative of, a network of pipes which may transport a production fluid (e.g., hydrocarbon) from one location to another.

As mentioned, the system 1600 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in OLGA® or the PETREL® software, for example, that operates on pipeline configuration, seismic attribute(s), etc. As an example, a workflow may be a process implementable in the OCEAN® framework. As an example, a workflow may include one or more worksteps that access a module such as a plug-in (e.g., external executable code, etc.).

Figure 17:
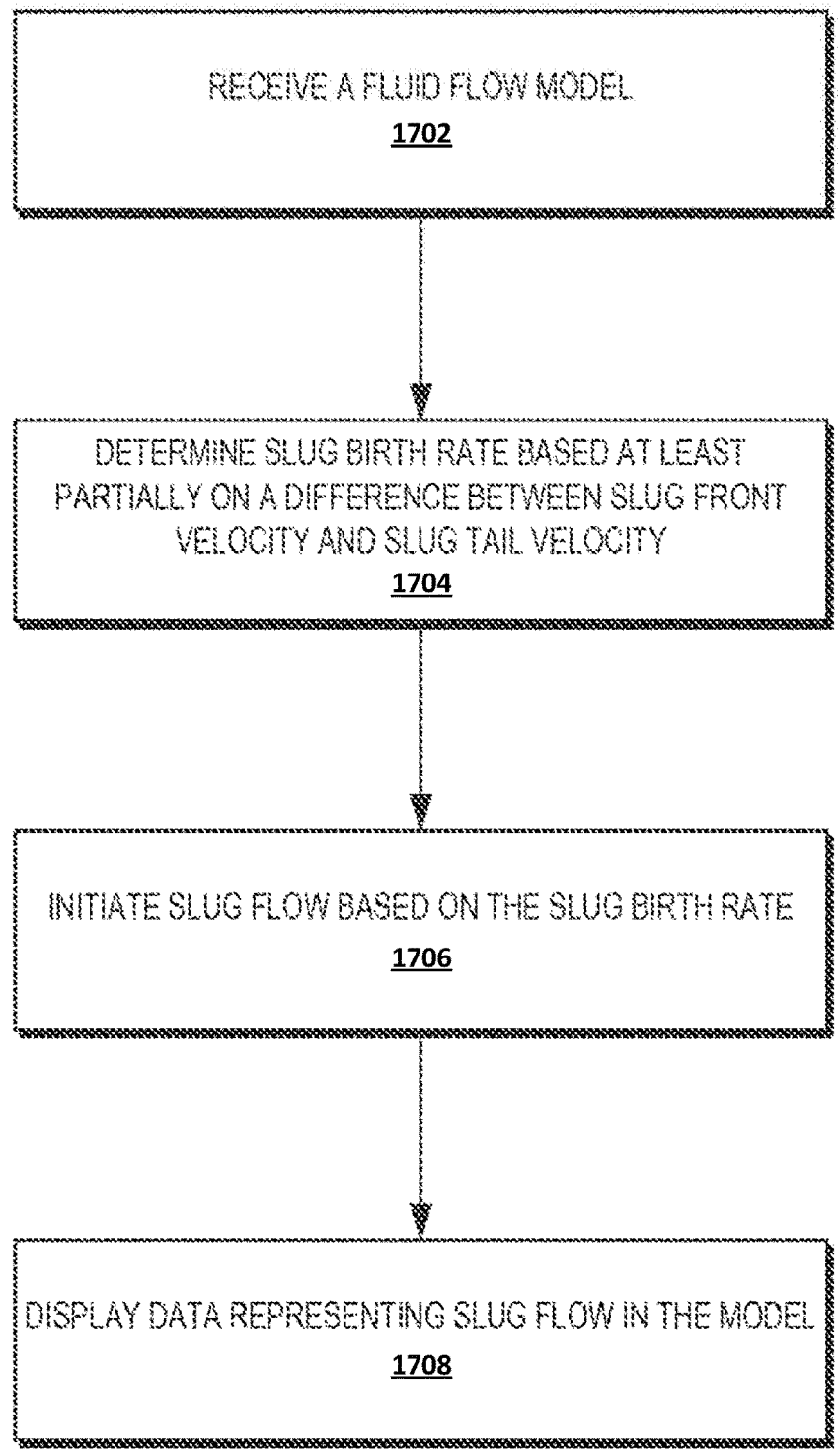
FIG. 17 illustrates a flowchart of a method for modeling slug flow in a multiphase flow according to an embodiment of the present disclosure.

FIG. 17 illustrates a flowchart of a method 1700 for modeling a slug flow, e.g., in a multiphase fluid flow model, according to an embodiment. The method 1700 may be employed as part of a fluid flow or pipeline model. The model may include representations of one or more fluid conduits (e.g., pipes, wells) and/or other pipeline equipment (compressors, pumps, separators, slug catchers, etc.). Such models may be representative of real-world, physical pipelines systems, or may be constructed as part of the planning of such systems.

Accordingly, in some embodiments, the method 1700 may include creating a multiphase fluid transient flow model, such as by using OLGA® or any other suitable pipeline modeling/simulation system. In another embodiment, the method 1700 may include receiving a completed fluid flow model. Either case may be considered as part of receiving a fluid flow model, e.g., as at 1702. As indicated, the model may include a representation of one or more conduits, as well as a flow of multiphase fluid therein. The conduits may be modeled, e.g., according to geometry (e.g., diameter, length, etc.), pressure change, elevation gain, heat transfer, and/or the like. For the remainder of the present description, the model is described in terms of "pipes"; however, it will be readily apparent that the disclosure is not limited to pipes and may apply to any type of fluid conduit. In an embodiment, the multiphase fluid flow may be modeled based on the parameters of the pipes (and/or other equipment), as well as the underlying equations of mass, state, energy, etc.

The method 1700 may also include determining a slug birth rate in the multiphase fluid flow, as at 1704. The slug birth rate may be determined based on one or more of a variety of factors, which may be provided as part of a slug birth rate model. The birth rate, generally referred to as 'B' herein, may thus represent the number of new slugs per length of pipe per second.

The slug birth rate may be zero unless conditions exist that allow slugs to form. A first one of such conditions may be known as a "minimum slip criterion" or "slug growth criterion." More particularly, in an embodiment, the minimum slip criterion may be satisfied if, were a slug to be introduced into the flow, the velocity of the slug front $V_F$ would exceed the velocity of the slug tail $V_T$ (i.e., $V_F - V_T > 0$). The difference between $V_F$ and $V_T$ may represent a mean growth rate of slugs, and may also be representative of a distance from the minimum slip boundary, or the degree of instability of the local separated flow. Accordingly, the value of the difference may represent a driving force, and thus an increasing probability, for new slugs to form, as will be described below. For a slug to be counted (e.g., in the determination of N, below) it may have a length of at least the pipe diameter D. Thus, the time for a slug to form may scale as $D/(V_F - V_T)$, and the rate at which new slugs form may scale as $(V_F - V_T)/D$.

To determine slug tail velocity $V_T$, a correlation for slug tail velocity $V_T$ may be implemented in terms of mixture velocity $u_M$, gravity g, pipe diameter D, inclination angle above the horizontal $\theta$, and/or other quantities. Accordingly, slug tail velocity $V_T$ may be defined as:

$$V_T = f(u_M, g, D, \theta, \ldots) \quad (6)$$

The slug front velocity $V_F$ may be given by a mass balance across the slug front:

$$(V_F - u_{GS}^F)\alpha_{GS}^F = (V_F - u_{GS}^T)\alpha_{GB}^T \quad (7)$$

Solving equation (2) for $V_F$:

$$V_F = \frac{\alpha_{GB}^T u_{GB}^T - \alpha_{GS}^F u_{GS}^F}{\alpha_{GB}^T - \alpha_{GS}^F} \quad (8)$$

where $\alpha_{GS}^F$ and $u_{GS}^F$ represent the cross-sectional holdup and cross-sectional mean velocity of gas at the front of the slug, respectively, and $\alpha_{GB}^T$ and $u_{GB}^T$ represent the same quantities at the tail of the zone of separated flow immediately ahead of the slug. Further, equations (7) and (8) may be evaluated when slugs are not present. In such case, values for $\alpha_{GS}^F$ and $u_{GS}^F$ may be provided (e.g., as hypothetical values), while $\alpha_{GB}^T$ and $u_{GB}^T$ may take values corresponding to the separated flow.

When the minimum slip criterion (first condition) is satisfied, slugs may grow from the slug precursors, if such precursors are available (second condition). The spatial frequency of slug formation may thus be proportional to the number of large waves (or slug precursors) per unit pipe length $N_W$. However, the presence (or proximity) of slugs may decrease the subsequent formation of slugs, and thus the birth rate B may take into consideration slugs that have already formed. Accordingly, the second condition that may be satisfied in order for slug flow to exist may be that the density of slugs present in the pipe N (slugs per unit length of pipe) may not exceed the density of large wave slug precursors (i.e., $N_W - N > 0$).

To determine the number of slug precursors or large waves, a delay constant may be implemented. As such, the density of large wave slug precursors $N_W$ may be estimated, as $N_W = u_L/(V_T \Omega D)$, where $\Omega$ is the delay constant and $u_L$ is the local mean liquid velocity. In another embodiment, a mechanistic model for slug initiation frequency may be employed. For example, at the threshold of slug formation, the wave profile may be considered to be similar to the tail profile of an incipient slug, and the wave speed may approach the slug tail velocity. As such, the wavelength of the slug may be estimated using a quasi-steady slug tail profile model. The local slug density N at a particular grid point or control volume may be estimated based on the distances to the nearest slugs (if any) in each direction along the pipeline. If no slugs exist in either direction, then the slug density is zero.

In an embodiment, the wave profile may be obtained by solving a first order, ordinary differential equation for liquid holdup $\alpha L_W(\xi)$, $$\frac{d\alpha_{LW}}{d\xi} = \frac{Z}{Y} \quad (9)$$

This may represent a reduced form of a steady-state, two- (or more) fluid model, which may be based at least in part on an assumption that the wave (slug precursor) propagates without changing shape. As such, the flow may be considered quasi-steady in a frame of reference moving with the tail speed. In equation (9), $\xi$ represents the spatial coordinate measured backwards from the wave crest (tail of the slug precursor). In the two-fluid model, Z represents the equilibrium terms: friction and the axial component of gravity, which in the case where the separated flow is stratified are according to equation (10):

$$Z = \frac{\tau_{IW} S_{IW} - \tau_{LW} S_{LW}}{\alpha_{LW} A} + \frac{\tau_{IW} S_{IW} + \tau_{GW} S_{GW}}{(1 - \alpha_{LW}) A} - (\rho_L - \rho_G) g \sin\theta \quad (10)$$

The denominator Y in equation (9) may represent one or more non-equilibrium terms, such as inertial and hydraulic gradient terms, which, for stratified flow, may be:

$$Y = \rho_L \frac{\hat{u}_{SL}^2}{\alpha_{LW}^3} + \rho_G \frac{\hat{u}_{SG}^2}{(1-\alpha_{LW})^3} - (\rho_L - \rho_G)g\cos\theta \frac{A}{S_{LW}} \quad (11)$$

The terms $\tau_{IW}$, $\tau_{LW}$, and $\tau_{GW}$ represent the shear stresses between the gas and liquid, between the liquid and the pipe wall, and between the gas and the pipe wall, respectively, while $S_{IW}$, $S_{LW}$, and $S_{GW}$ represent the corresponding perimeter lengths, and the subscript 'W' denotes "wave." A is the pipe cross-sectional area, $\hat{u}_{SL}$ and $\hat{u}_{SG}$ are the superficial velocities of liquid and gas, respectively, relative to the moving frame of reference, $\rho_L$ and $\rho_G$ are the liquid and gas densities, respectively, g is the acceleration of gravity and $\theta$ represents the angle of inclination of the pipe above the horizontal.

The mean holdup may be determined by integration over the wave profile:

$$\overline{\alpha_{LW}} = \frac{1}{L_W} \int_0^{L_W} \alpha_{LW}(\xi) d\xi \quad (12)$$

where $L_W$ is the distance between the tail of one slug precursor and the front of the next. Further, the slug length of the slug precursor may be set to zero, or any other value, for example a length of a few diameters, in order to determine the frequency of slug precursors. Moreover, an approximate solution may be introduced for the wave profile in the exponential form, as equation (13):

$$\alpha_{LW} \approx \tilde{\alpha}_{LW}(\xi) = \alpha_{LW}^E + (\alpha_{LW}^0 - \alpha_{LW}^E)e^{-k\xi} \quad (13)$$

where $\alpha_{LW}^E$ is a hypothetical equilibrium holdup achieved for a very long wave tail, $\xi \to \infty$, $Z \to 0$, and $\alpha_{LW}^0$ is the hold up at the wave crest (slug tail), which may be set equal to the slug body holdup of the incipient slug. When the void in the slug is neglected, $\alpha_{LW}^0$ may be set to unity. As such, the mean holdup value of the liquid corresponding to the approximate profile may be:

$$\overline{\alpha_{LW}} \approx \alpha_{LW}^E + (\alpha_{LW}^0 - \alpha_{LW}^E)\frac{1}{kL_W}(1 - e^{kL_W}) \quad (14)$$

In embodiments, the product $kL_W$ may be about three (or another, moderately large number), so that the stratified zone is long enough for the liquid level to approach the equilibrium value and the exponential term in equation (14) may be neglected. In such a case, $L_W$ may be determined from:

$$L_W \approx \frac{1}{k} \frac{\alpha_{LW}^0 - \alpha_{LW}^E}{\overline{\alpha_{LW}} - \alpha_{LW}^E} \quad (15)$$

To estimate the value of k, the spatial derivative of the exponential profile may be given as:

$$\frac{d\tilde{\alpha}_{LW}}{d\xi} = -k(\alpha_{LW}^0 - \alpha_{LW}^E)e^{-k\xi} = -k(\tilde{\alpha}_{LW} - \alpha_{LW}^E) \quad (16)$$

so that a value of the exponential coefficient k may be estimated from $$k \approx k^R = -\left[\frac{1}{\alpha_{LW} - \alpha_{LW}^E} \frac{d\alpha_{LW}}{d\xi}\right]_{\alpha_{LW} = \alpha_{LW}^R} = \frac{-1}{\alpha_{LW}^R - \alpha_{LW}^E}\left[\frac{Z}{Y}\right]_{\alpha_{LW} = \alpha_{LW}^R} \quad (17)$$

Here, $\alpha_{LW}^R$ may be a reference value of the holdup taken at a point along the profile. In an embodiment, the value of $\alpha_{LW}^R$ may be selected such that the half-angle $\delta$ subtended by the liquid layer at the pipe center is between the equilibrium value $\delta^E$ and the value of the slug tail $\delta^0$, weighted by a fraction $c_K$:

$$\delta_R = \delta_E + c_K(\delta^0 - \delta^E) \quad (18)$$

The fraction $c_K$ may serve as a tuning variable in the model. The value may be predetermined or received, e.g., from a user, as part of the method 1700. For example, the fraction may be set as 0.18, but in other embodiments, may be any other suitable number. The holdup may be given in terms of the half angle $\delta$ by $\alpha_{LW} = (\delta - \cos\delta\sin\delta)/\pi$.

An estimate for the number of precursor waves per unit length may thus be:

$$N_W \approx c_W \frac{\overline{\alpha_{LW}} - \alpha_{LW}^E}{(\alpha_{LW}^0 - \alpha_{LW}^E)(\alpha_{LW}^R - \alpha_{LW}^E)}\left[\frac{-Z}{Y}\right]_{\alpha_{LW} = \alpha_{LW}^R} \quad (19)$$

where $c_W$ may be a free tuning parameter, which may be set, for example, as 1.

When the wave propagates without change of form, the liquid flux relative to the moving frame of reference may be constant along the wave profile, such that:

$$\alpha_{LW}\hat{u}_{LW} \approx \hat{u}_{SL} \quad (20)$$

where $\hat{u}_{LW} = V_W - u_{LW}$ is the liquid velocity (measured backwards) relative to the wave crest (slug tail) and $\hat{u}_{SL} = V_W - u_{SL}$ is the corresponding superficial velocity. Continuity of liquid holdup and flux across the slug tail may give $\alpha_{LW}^0 = \alpha_{LS}^T$ and $\hat{u}_{SL} = (V_W - u_{LS}^T)\alpha_{LS}^T$, where $\alpha_{LS}^T$ and $u_{LS}^T$ are the holdup and velocity of liquid, respectively, at the tail of the slug precursor (e.g., the crest of the wave). In some embodiments, gas entrainment may be ignored, and $\alpha_{LS}^T \approx 1$, $\delta^0 = \pi$, and $u_{LS}^T = u_M$, such that $\hat{u}_{SL} \approx V_W - u_M$, where $u_M$ is a local mixture velocity.

The mean liquid flux in the wave may be determined as:

$$q_L = \alpha_L u_L = \frac{1}{L_W}\int_0^{L_W} \alpha_{LW}(\xi)u_{LW}(\xi)d\xi \quad (21)$$

Further, as $u_{LW} = V_W - \hat{u}_{SL}/\alpha_{LW}$, liquid flux becomes:

$$q_L = \frac{1}{L_W}\int_0^{L_W} (V_W\alpha_{LW} - \hat{u}_{SL})d\xi = V_W\overline{\alpha_{LW}} - \hat{u}_{SL} \quad (22)$$

yielding:

$$V_W = \frac{u_M - q_L}{1 - \overline{\alpha_{LW}}} = u_G \quad (23)$$

in which $u_G$ is the mean gas velocity

For a developing flow, the liquid holdup $\alpha_L$ and the flux $q_L$ may be determined independently. As such, the wave velocity $V_W$, which may be equal to the gas velocity $u_G$ in the case with no gas entrainment, may differ from the slug tail velocity $V_T$. This potential inconsistency may be resolved in at least two ways. First, in a steady flow, the wave velocity may be equal to the slug tail velocity, $V_W = V_T$, which may be regarded as an approximation for unsteady flow. In such case, the wave model may take $\overline{\alpha_{LW}}$ to be the local value of $\alpha_L$ (and may not use the liquid flux $q_L$). Second, a local value for the liquid flux $q_L$ may be determined, and equation (23) may be employed to obtain an adjusted value for the mean holdup corresponding to the wavy flow:

$$\overline{\alpha_{LW}} = 1 - \frac{u_M - q_L}{V_T} \tag{24}$$

In this case, the wave model may use a liquid holdup value $\overline{\alpha_{LW}}$ corresponding to the local value of $q_L$ (and may not use $\alpha_L$).

In some embodiments, determining a slug death rate model may not be needed, as a slug may simply be considered to be dead with its characteristic length $L_S$ approaches zero. In other embodiments, a slug death rate may be determined. If slugs are present, and the slug tail velocity $V_T$ is greater than the slug front velocity $V_F$, the slugs may decrease in length. The mean front and tail velocity of relatively short slugs may be considered generally constant, thus the model may neglect slugs for which the tail velocity differs from the standard form. Thus, the rate at which the slugs disappear may be proportional to $(V_T - V_F)\psi(0)$. The function $\psi(L_S)$ represents the probability density function of slugs of length $L_S$, and $\psi(0)$ represents the probability density of slugs of zero (or substantially zero) length. In some embodiments, $\psi(0)$ may be proportional to $N/\overline{L_S}$ thus the death rate may be estimated by $$D = c_D \frac{N(V_T - V_F)}{\overline{L_S}}, V_T > V_F \tag{25}$$

where $c_D$ is another dimensionless constant that may be tuned to data. Further, to avoid a potential singularity when $\overline{L_S} \to 0$, an upper bound may be imposed for the slug death rate $D$ by adding a constant to the denominator, such as the pipe diameter, thereby yielding:

$$D = c_D \frac{N(V_T - V_F)}{\overline{L_S} + D}, V_T > V_F \tag{26}$$

In an embodiment, if both of the first condition (minimum slip criterion) and second conditions (available precursors) are satisfied, the birth rate $B$ may be determined according to the following equation:

$$B = \frac{c_B}{D}(N_W - N)(V_F - V_T) \tag{27}$$

In equation (27), D represents the pipe diameter, and $c_B$ is a constant of proportionality that is determined by matching the model with experimental data and/or field data. The birth rate model gives the birth rate B in terms of at least two factors, which represent the degree of instability of the local stratified flow, and the spatial density of slug precursors (slugs/meter).

The method 1700 may then proceed to initiating a slug flow in the fluid flow model based at least partially on the slug birth rate, as at 1706. In an embodiment, initiating slug flow may be conducted according to a population equation, which may employ the birth rate and/or death rate calculated above. An example of such a population equation may be as follows:

$$\frac{\partial N}{\partial t} + \frac{\partial}{\partial x}(NU_A) = B - D \tag{28}$$

where N is the number of slugs per unit pipe length, $U_A$ is the advection velocity, B is the slug birth rate, and D is the slug death rate. In some embodiments, as mentioned above, a model for slug death may be omitted; as length approaches zero, the slug may be considered dead.

In an embodiment, the simulation of the fluid flow model may proceed according to time steps $\Delta t$, where the equations describing the state of the cells or control volumes (e.g., lengths of pipe) of the model are resolved after one, some, or each time step. Further, the number of new slugs formed may be generally described in terms of the birth rate B, the control volume length $\Delta z$ and the time step $\Delta t$ as:

$$\Delta N = B \Delta z \Delta t. \tag{29}$$

However, the pipe length $\Delta z$ and/or the time step $\Delta t$ may be relatively short, such that $\Delta N$ is generally less than one and greater than or equal to zero. Accordingly, embodiments of the present method 1700 may employ the $\Delta N$ value as a probability. For example, the method 1700 may include generating a random or pseudo-random number X, which may be uniformly distributed on the interval [0, 1]. When $\Delta N > X$, a slug may be initiated, and if $\Delta N < X$, a slug may not be initiated.

When one or more slug flows at one or more lengths of pipe, at a time step, are resolved, the method 1700 may include displaying data representative of the slug flow, as at 1708. This may take any one or more of a variety of forms and may result in a representation of an underlying object changing, based on the simulation. For example, one or more slugs may be graphically represented in a pipe. In another embodiment, a frequency of slug flow, e.g., as a plot, may be created and/or modified according to the method 1700. In another embodiment, a slug length distribution, e.g., as a plot, may be created and/or modified according to the method 1700. In other embodiments, other types of graphical displays based on data from the underlying actual or hypothetical physical pipeline system may be provided.

CONCLUSION

The use of the flowback model to determine drawdown pressures, along with chemical analysis of flowback fluids, solids assessment, and accurate flow rates using a multiphase flow meter that will provide data to confirm and validate the results from the model allows for a shift from rule-of-thumb practice to a data-driven approach based on rock-fluid interactions that helps preserve fracture conductivity and hence increases estimated ultimate recovery (EUR) and well production performance.

The flowback systems and methods described herein allows for prediction, detection, estimation, and response when there are rapid changes in the bottomhole pressure during flowback. The use of a multiphase flow meter provides high speed, high resolution data, which allows for flow rate adjustments to be made within one well piping volume that may not be possible with other separator/phase monitoring systems. The speed of this measurement allows for novel responses to slugging situations—detection of oscillating or rapidly varying excessive drawdown pressure change rates that are not otherwise detectable.

Also, the flowback systems and methods described herein provide automation and connection of the multiphase flow meter with water chemistry measurements such as conductivity and an automated choke that allows for control of downhole pressures in a gradual manner, maintaining conductivity in channels that are only partially propped.

Additionally, the flowback systems and methods described herein provide data storage, data integration, and data analytics processes to use as background knowledge to calibrate engineered flowback procedures for subsequent wells. Data can be incorporated into, for example, HRA (Heterogeneous Rock Analysis), or an alternate rock classification system, where the rock type data is processed for flowback management on subsequent wells.

There have been described and illustrated herein several embodiments of a flowback system and a flowback control method. While particular embodiments have been described, it is not intended that the disclosure be limited thereto, as it is intended that the disclosure be as broad in scope as the art will allow and that the specification be read likewise. In addition, while particular types of devices have been disclosed, it will be understood that other devices having the same function(s) can be used. For example, and not by way of limitation, multiple single phase flow meters may be used instead of a single multiphase flow meter. It will therefore be appreciated by those skilled in the art that yet other modifications could be made to the provided disclosure without deviating from its spirit and scope as claimed.

What is claimed is:

1. A method of determining at least one bottomhole condition in a well, the method comprising:
   measuring fluid properties, via one or more sensors, of fluids produced at a surface-location of the well, wherein the well traverses a hydraulically fractured reservoir, wherein the measured fluid properties include flow rates of different fluid phases that are part of the fluids, and wherein the different fluid phases are selected from the group including an oil phase, a gas phase, a water phase, and a solid phase;
   using a transient fluid flow simulator to determine composition and properties of the fluids in the well between a surface-location of the well and at least one bottomhole-location of the well based on the measured fluid properties and based on calculations involving data characterizing mineralogy of the hydraulically fractured reservoir;
   calculating at least one bottomhole condition in the well based on the determined composition and properties of the fluids in the well between the surface-location and the at least one bottomhole-location of the well; and
   controlling a flowback operation in the well based at least in part on the at least one bottomhole condition;
   wherein controlling the flowback operation in the well further comprises:
   calculating a drawdown pressure in the well at a particular time, wherein the drawdown pressure in the well is a function of a rate of a bottomhole pressure change and a bottomhole fluid rate;
   determining when the calculated drawdown pressure is outside a particular safe zone defined by upper and lower limits on drawdown pressure as a function of time; and
   adjusting a surface-located choke in response to determining the calculated drawdown pressure is outside the particular safe zone.

2. The method according to claim 1, wherein:
the measured fluid properties include pressure before or at the surface-located choke.

3. The method according to claim 2, wherein:
the surface-located choke includes a variable sized aperture, and the measured fluid properties include pressure downstream of the variable sized aperture of the surface-located choke.

4. The method according to claim 2, wherein:
the surface-located choke includes a variable sized aperture, and the measured fluid properties include pressure upstream of the variable sized aperture of the surface-located choke.

5. The method according to claim 1, wherein:
the transient fluid flow simulator determines the composition and properties of the fluids in the well between the surface-location of the well and the at least one bottomhole-location of the well based further on calculations involving a set point or other predefined parameter.

6. The method according to claim 1, wherein:
the transient fluid flow simulator determines the composition and properties of the fluids in the well between the surface-location of the well and the at least one bottomhole-location of the well based further on calculations involving data from at least one other well.

7. The method according to claim 1, wherein:
the transient fluid flow simulator determines the composition and properties of the fluids in the well between the surface-location of the well and the at least one bottomhole-location of the well based further on calculations involving data derived during drilling the well.

8. The method according to claim 1, wherein:
the at least one bottomhole condition includes pressure in the well at at least one bottomhole location of the well.

9. The method according to claim 1, wherein:
the transient fluid flow simulator determines the composition and properties of the fluids in the well between the surface-location of the well and the at least one bottomhole location of the well for a first period of time based on the measured fluid properties measured over a second period of time that precedes the first period of time.

10. The method according to claim 9, wherein:
the transient fluid flow simulator determines the composition and properties of the fluids in the well for the first period of time based on an extrapolation of the measured fluid properties during the second period of time.

11. The method according to claim 1, further comprising:
using a plurality of transient fluid flow simulators to individually determine the composition and properties of the fluids in the well between the surface-location of the well and at least one bottomhole-location of the well based on the measured fluid properties;
comparing the measured fluid properties, respectively, with sets of properties determined by each of the transient fluid flow simulators; and
selecting at least one of the transient fluid flow simulators based on the comparing, wherein the at least one bottomhole condition in the well is calculated based on the determination of the composition and properties of the fluids in the well determined by the selected at least one of the transient fluid flow simulators, wherein the plurality of transient fluid flow simulators reflect different flowback scenarios.

12. The method according to claim 1, wherein:
the fluid properties of the fluids produced at a surface-location of the well are measured in real-time;
the transient fluid flow simulator determines in real-time the composition and properties of the fluids in the well between the surface-location of the well and at least one bottomhole-location of the well based on the real-time measurement of the fluid properties; and
the at least one bottomhole condition in the well is calculated in real-time based on the real-time determination of the composition and properties of the fluids in the well, wherein the transient fluid flow simulator is updated in real-time such that determined properties of the fluids at the surface-location in the well matches the measured fluid properties at the surface-location in the well.

13. The method according to claim 1, wherein:
calculating the at least one bottomhole condition in the well includes calculating multiple estimates of bottomhole pressure and a statistical distribution of the bottomhole pressure.

14. The method according to claim 1, wherein:
adjusting the surface-located choke comprises closing the surface-located choke when the calculated drawdown pressure is above the particular safe zone or opening the surface-located choke when the calculated drawdown pressure is below the particular safe zone.

15. A method of determining fracture properties in a hydraulically fractured reservoir, the method comprising:
measuring fluid properties, via one or more sensors, of fluids produced at a surface-location of a well that traverses the hydraulically fractured reservoir, wherein the measured fluid properties include flow rates of different fluid phases that are part of the fluids, and wherein the different fluid phases are selected from the group including an oil phase, a gas phase, a water phase, and a solid phase;
using a transient fluid flow simulator to determine at least one fracture property at at least one bottomhole location of the well over time based on the measured fluid properties, wherein the at least one fracture property characterizes fracture conductivity of a fracture in a near-wellbore region adjacent the well; and
controlling a flowback operation in the well based at least in part on the at least one fracture property; wherein controlling the flowback operation in the well further comprises:
calculating a drawdown pressure in the well at a particular time, wherein the drawdown pressure in the well is a function of a rate of a bottomhole pressure change and a bottomhole fluid rate;
determining when the calculated drawdown pressure is outside a particular safe zone defined by upper and lower limits on drawdown pressure as a function of time; and
adjusting a surface-located choke in response to determining the calculated drawdown pressure is outside the particular safe zone.

16. The method according to claim 15, wherein:
the at least one fracture property characterizes unpropped fracture area of a fracture in a near-wellbore region adjacent the well.

17. The method according to claim 15, further comprising:
estimating a safe drawdown operating envelope based on the determined at least one fracture property, wherein the safe drawdown operating envelope is defined as a function of bottomhole pressure, rate of bottomhole pressure change, and bottomhole fluid rate, and wherein the safe drawdown operating envelope defines an upper drawdown limit corresponding to a condition where fracture pinch is predicted in a near-wellbore region adjacent the well.

18. The method according to claim 17, further comprising:
determining a risk of unwanted condition based on the at least one fracture property, wherein the unwanted condition is selected from the group consisting of formation failure, fracture pinchout and a combination thereof,
wherein the safe drawdown operating envelope defines an upper drawdown limit corresponding to a condition where the fracture pinch is predicted in a near-wellbore region adjacent the well, and wherein the safe drawdown operating envelope is based on the determined risk of unwanted condition.

19. A method of determining at least one bottomhole condition in a well, the method comprising:
measuring fluid properties, via one or more sensors, of fluids produced at a surface-location of the well, wherein the well traverses a hydraulically fractured reservoir, wherein the measured fluid properties include flow rates of different fluid phases that are part of the fluids, and wherein the different fluid phases are selected from the group including an oil phase, a gas phase, a water phase, and a solid phase;
using a transient fluid flow simulator to determine composition and properties of the fluids in the well between a surface-location of the well and at least one bottomhole-location of the well based on the measured fluid properties and based on calculations involving data derived during drilling the well;
calculating at least one bottomhole condition in the well based on the determined composition and properties of the fluids in the well between the surface-location and the at least one bottomhole-location of the well; and
controlling a flowback operation in the well based at least in part on the at least one bottomhole condition;
wherein controlling the flowback operation in the well further comprises:
calculating a drawdown pressure in the well at a particular time, wherein the drawdown pressure in the well is a function of a rate of a bottomhole pressure change and a bottomhole fluid rate;
determining when the calculated drawdown pressure is outside a particular safe zone defined by upper and lower limits on drawdown pressure as a function of time; and
adjusting a surface-located choke in response to determining the calculated drawdown pressure is outside the particular safe zone.

20. A method of determining at least one bottomhole condition in a well, the method comprising:
measuring fluid properties, via one or more sensors, of fluids produced at a surface-location of the well, wherein the well traverses a hydraulically fractured reservoir, wherein the measured fluid properties include flow rates of different fluid phases that are part of the fluids, and wherein the different fluid phases are selected from the group including an oil phase, a gas phase, a water phase, and a solid phase;

using a transient fluid flow simulator to determine composition and properties of the fluids in the well between a surface-location of the well and at least one bottomhole-location of the well based on the measured fluid properties;

calculating at least one bottomhole condition in the well based on the determined composition and properties of the fluids in the well between the surface-location and the at least one bottomhole-location of the well, wherein calculating the at least one bottomhole condition in the well includes calculating multiple estimates of bottomhole pressure and a statistical distribution of the bottomhole pressure; and controlling a flowback operation in the well based at least in part on the at least one bottomhole condition; wherein controlling the flowback operation in the well further comprises:

calculating a drawdown pressure in the well at a particular time, wherein the drawdown pressure in the well is a function of a rate of a bottomhole pressure change and a bottomhole fluid rate;

determining when the calculated drawdown pressure is outside a particular safe zone defined by upper and lower limits on drawdown pressure as a function of time; and adjusting a surface-located choke in response to determining the calculated drawdown pressure is outside the particular safe zone.

21. The method according to claim 20, further comprising:

measuring at least one bottomhole condition of the well at a bottomhole location of the well;

comparing the at least one measured bottomhole condition with the calculated at least one bottomhole condition; and tuning or validating the transient flow simulator based on the comparison between the at least one measured bottomhole condition with the calculated at least one bottomhole condition.

\* \* \* \* \*